United States Patent
Shah et al.

(10) Patent No.: US 11,426,867 B2
(45) Date of Patent: Aug. 30, 2022

(54) ROBOT SIMULATION ENGINE ARCHITECTURE

(71) Applicant: Duality Robotics, Inc., Hayward, CA (US)

(72) Inventors: Apurva Shah, San Mateo, CA (US); Michael Allen Taylor, Wexford, PA (US); Jason DePerro, San Mateo, CA (US)

(73) Assignee: DUALITY ROBOTICS, INC., Hayward, CA (US)

( * ) Notice: Subject to any disclaimer, the term of this patent is extended or adjusted under 35 U.S.C. 154(b) by 215 days.

(21) Appl. No.: 16/800,181

(22) Filed: Feb. 25, 2020

(65) Prior Publication Data

US 2020/0276708 A1 Sep. 3, 2020

Related U.S. Application Data

(60) Provisional application No. 62/812,255, filed on Mar. 1, 2019.

(51) Int. Cl.
*B25J 9/16* (2006.01)
*B25J 5/00* (2006.01)
(Continued)

(52) U.S. Cl.
CPC ............ *B25J 9/1605* (2013.01); *B25J 5/007* (2013.01); *B25J 9/161* (2013.01); *B25J 9/163* (2013.01);
(Continued)

(58) Field of Classification Search
None
See application file for complete search history.

(56) References Cited

U.S. PATENT DOCUMENTS 9,811,074 B1 11/2017 Aichele et al.
10,185,999 B1 * 1/2019 Konrardy ............... G07C 5/008
(Continued)

OTHER PUBLICATIONS https://www.youtube.com/watch?v=hWWPJSd36wY "Assassin's Creed 4—Naval Contract—Eye for an Eye Walkthrough". Youtube, video game recording. Accessed Jun. 14, 2022. (Year: 2013).*
(Continued)

*Primary Examiner* — Jaime Figueroa
*Assistant Examiner* — Arslan Azhar
(74) *Attorney, Agent, or Firm* — Fenwick & West LLP

(57) ABSTRACT

A virtualization system implemented within a cloud server enables the simulation of robot structure and behavior in a virtual environment. The simulated robots are controlled by clients remote from the cloud server, enabling human operators or autonomous robot control programs running on the clients to control the movement and behavior of the simulated robots within the virtual environment. Data describing interactions between robots, the virtual environment, and objects can be recorded for use in future robot design. The virtualization system can include robot templates, enabling users to quickly select and customize a robot to be simulated, and further enabling users to update and re-customize the robot in real-time during the simulation. The virtualization system can re-simulate a portion of the robot simulation when an intervention by a human operator is detected, positioning robots, people, and objects within the virtual environment based on the detected intervention.

20 Claims, 9 Drawing Sheets

(51) Int. Cl.
  *B25J 13/08* (2006.01)
  *B25J 19/04* (2006.01)
  *G06F 11/34* (2006.01)

(52) U.S. Cl.
  CPC ........... *B25J 9/1651* (2013.01); *B25J 9/1671* (2013.01); *B25J 9/1674* (2013.01); *B25J 9/1689* (2013.01); *B25J 9/1694* (2013.01); *B25J 13/081* (2013.01); *B25J 13/088* (2013.01); *B25J 19/04* (2013.01); *G06F 11/3457* (2013.01)

(56) References Cited

U.S. PATENT DOCUMENTS

| | | | |
|---|---|---|---|
| 2003/0005439 A1* | 1/2003 | Rovira | H04N 21/4314 725/37 |
| 2006/0090022 A1* | 4/2006 | Flynn | G06F 3/033 710/105 |
| 2019/0043278 A1 | 2/2019 | Stefan et al. | |
| 2019/0050520 A1 | 2/2019 | Alvarez et al. | |
| 2019/0155291 A1 | 5/2019 | Heit et al. | |
| 2019/0318267 A1* | 10/2019 | Zhang | G06F 30/20 |
| 2019/0369626 A1* | 12/2019 | Lui | G05D 1/0219 |
| 2019/0382003 A1* | 12/2019 | Jiang | B60W 50/14 |
| 2020/0005662 A1* | 1/2020 | Palmer | G09B 9/052 |
| 2020/0030988 A1 | 1/2020 | Anderson et al. | |
| 2020/0167436 A1* | 5/2020 | Xiao | G09B 9/05 |

OTHER PUBLICATIONS

United States Office Action, U.S. Appl. No. 16/800,182, filed Mar. 14, 2022, 28 pages.
Kartal et al. "Safer Deep RL with Shallow MCTS: A Case Study in Pommerman" arXiv: 1904.05759v1 [cs. LG] [retrieved on Apr. 15, 2022] (Year: 2019).
Kendall et al. "Learning to Drive in a Day" 2019 International Conference on Robotics and Automation (ICRA), Palais des congres de Montreal, Montreal, Canada, May 20-24, 2019 [retrieved on Apr. 15, 2022] (Year: 2019).
Nicolescu et al. "Natural Methods for Robot Task Learning: Instructive Demonstrations, Generalization and Practice" AAMAS'03, Jul. 14-18, 2003, Melbourne, Australia [retrieved on Apr. 8, 2022] (Year: 2003).
Skruch et al. "The Simulation Strategy and Its Realization in the Development Process of Active Safety and Advanced Driver Assistance Systems" SAE Technical Paper 2015-01-1401, 2015, doi: 10.4271/2015-01-1401 [retrieved on Mar. 10, 2020] (Year: 2015).

* cited by examiner

ROBOT SIMULATION ENGINE ARCHITECTURE

CROSS-REFERENCE TO RELATED APPLICATIONS

This application claims the benefit of and priority to U.S. Provisional Application No. 62/812,255 filed Mar. 1, 2019, entitled "Non-deterministic and adversarial testing of autonomous systems with a multiplayer client server architecture", the contents of which are incorporated by reference herein in their entirety.

BACKGROUND

This description generally relates to robotics, and more specifically to the simulation of robot structure and behavior within a virtual environment.

The design and testing of robots can be expensive. In particular, physical build-outs of robots involve multiple robot components that are often costly, such as processors, sensors, effectors, power sources and power buses, and the like. Likewise, robot design and testing can be very time-consuming, often requiring multiple iterations of robot build-outs before a final design is selected. The design, build-out, and test cycle can be iterated multiple times, further increasing the costs of robot design. Accordingly, there is a need to streamline robot design and testing in order to both lower costs and reduce the amount of time required to settle on a final robot design.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
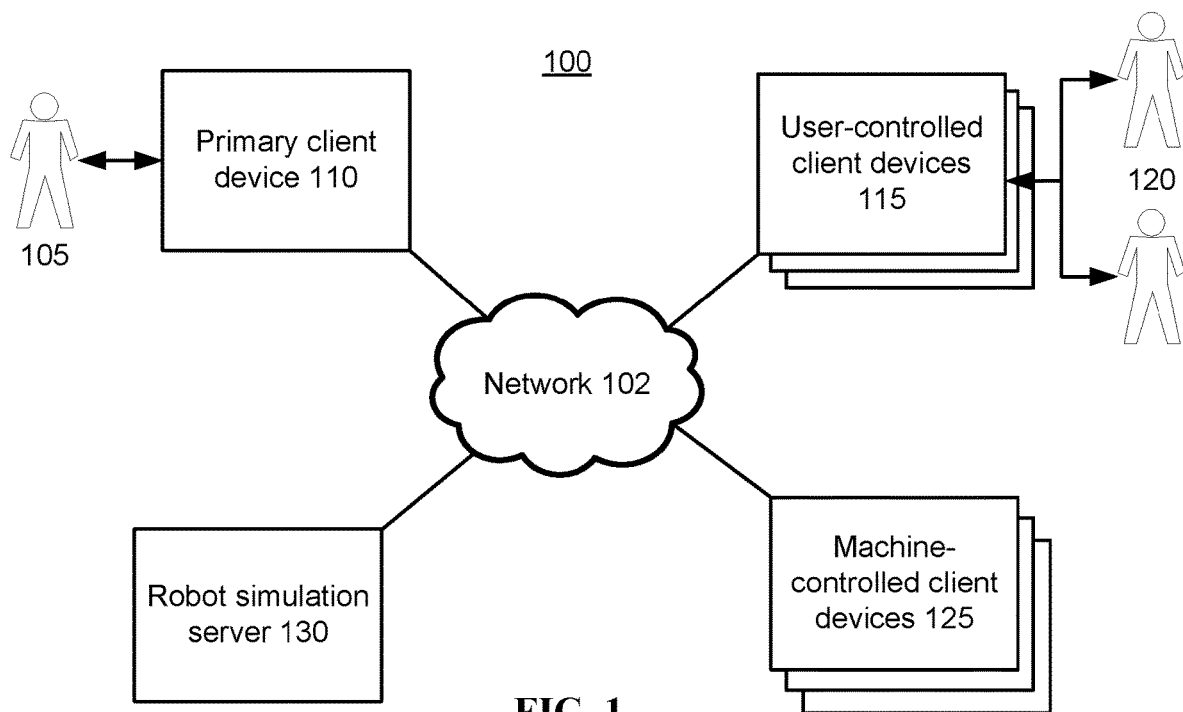
FIG. 1 illustrates a system environment of a robot simulation server, according to one embodiment.

FIG. 1 illustrates a system environment 100 of a robot simulation server 130, according to one embodiment. The system environment 100 (or simply "environment 100") includes a user 105 associated with a primary client device 110, users 120 associated with a set of user-controlled client devices 115, a set of machine-controlled client devices 125, and a robot simulation server 130, all connected via the network 102. In alternative configurations, different and/or additional components may be included in the system environment 100.

A user 105 of the system environment 100 is an individual that wants to simulate robot structure or behavior using the robot simulation server 130, or that wants to develop data for the training or development of robotic or automated systems. The user 105 interacts with the robot simulation server 130 using the primary client device 110 in order to initialize, customize, begin, run, and monitor a robot simulation session. Likewise, users 120 are individuals that participate in the simulation of robot structure or behavior by controlling one or more virtual robots within a virtual environment generated or instantiated by the robot simulation server 130. The users 120 interact with the robot simulation server 130 using the user-controlled client devices 115, for instance by providing inputs to control the robot via the user-controlled client devices 115. It should be noted that in some robot simulation sessions, the user 105 also controls one or more virtual robots within the virtual environment using the primary client device 110.

The primary client device 110 and each user-controlled client device 115 (collectively and individually referred to as "client device" or "client devices" hereinafter) are one or more computing devices capable of receiving user input as well as transmitting and/or receiving data via a network 102. In one embodiment, a client device is a conventional computer system, such as a desktop or a laptop computer. Alternatively, a client device may be a device having computer functionality, such as a personal digital assistant (PDA), a mobile telephone, a smartphone, or another suitable device. A client device is configured to communicate via a network 102. In one embodiment, a client device executes an application allowing a user of the client device to interact with the robot simulation server 130. For example, a client device executes a browser application or native application to enable interaction between the client device and the robot simulation server 130 via a network 102. In another embodiment, a client device interacts with the robot simulation server 130 through an application programming interface (API) running on a native operating system of the client device, such as IOS® or ANDROID™.

The machine-controlled client devices 125 are client devices that autonomously control virtual robots, virtual people, virtual objects, or portions of the virtual environment during a robot simulation session. As with the user-controlled client devices 115, inputs for controlling one or more virtual robots within a virtual environment generated or instantiated by the robot simulation server 130 are provided by the machine-controlled client device 125. However, unlike the user-controlled client device 115, which provide instructions for controlling virtual robots or manipulating the virtual environment based on inputs received by the users 120, inputs for controlling one or more virtual robots provided by a machine-controlled client device 125 are generated by an autonomous robot control program running on the machine-controlled client device. As used herein, "autonomous robot control program" refers to software or logic implemented or executed by a machine-controlled client device 125 that receives data from one or more virtual sensors of a virtual robot representative of a context, state, and other characteristics of the virtual robot within the virtual environment and provides movement or behavior instructions for the virtual robot based on the received data.

It should be noted that in various embodiments, the primary client device 110, the user-controlled client devices 115, and the machine-controlled client devices 125 overlap. For instance, the primary client device 110 can be used by the user 105 to request a robot simulation session, but can include an autonomous robot control program configured to control a robot during the simulation session autonomously. It should also be noted that in some embodiments, the primary client device 110, the user-controlled client devices 115, and/or the machine-controlled client devices 125 can, collectively or individually, be implemented within a network of one or more computers that collectively interact with the robot simulation server 130.

In some embodiments, a user (such as the user 105 or the users 120) can monitor the autonomous operation of a robot during the robot simulation session by an autonomous robot control program, but can assume manual control of the robot (or "intervene" as used herein) during the simulation session. In some embodiments, a user (such as the user 105 or the users 120) can monitor the autonomous control of a robot, individual, or object within a virtual environment by the robot simulation server 130 (as opposed to by a machine-controlled client device 125), and can manually assume control of the monitored robot, individual, or object, for instance using the primary client device 110 or a user-controlled client device 115.

The robot simulation server 130 is a server that enables the simulation of robot structure and behavior within a virtual environment. The robot simulation server 130 is any computing system configured to perform the functions described herein. In some embodiments, the robot simulation server 130 is a standalone server or is implemented within a single system, such as a cloud server, while in other embodiments, the robot simulation server is implemented within one or more computing systems, servers, data centers, and the like. The functionality and components of the robot simulation server 130 is described below in greater detail, particularly within FIG. 2.

The primary client device 110, the user-controlled client devices 115, the machine-controlled client devices 125, and the robot simulation server 130 communicate via the network 102, which may include any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), file transfer protocol (FTP), and User Datagram Protocol (UDP). Data exchanged over the network 102 may be represented using any suitable format, such as hypertext markup language (HTML) or extensible markup language (XML). In some embodiments, all or some of the communication links of the network 102 may be encrypted using any suitable techniques.

As used herein, "robot" can refer to a robot in a traditional sense (e.g., a mobile or stationary robotic entity configured to perform one or more functions), and can also refer to any system or vehicle that can be autonomously and/or remotely controlled, or that executes autonomous control logic. For instance, the robot simulation server 130 can instantiate robots, automobiles (such as autonomously or manually controlled cars and trucks), construction equipment (such as autonomously or manually controlled bulldozers, excavators, and other tractors), delivery robots and vehicles, manufacturing robots and articulated arms, warehouse robots, logistics robots, drones and other aerial systems and vehicles, boats, motorcycles, scooters, spaceships and space robots, security systems, intrusion detection systems, monitoring systems, smart home or building systems, smart city or city planning systems, or any suitable system that can be autonomously and/or manually controlled.

By enabling a user (such as the user 105) to simulate the structure and behavior of a robot, the robot simulation server 130 can enable the user to test the design of a robot without having to physically assemble the robot and to create real-world environments and scenarios in which to test the robot. Such simulation can thus potentially save the user significant money that might otherwise be required to purchase and use robot components and in early or non-final iterations of the robot design. Likewise, by enabling the user to toggle, update, or modify aspects of the robot's design (for instance, by changing one or more characteristics of the robot) within the simulation, the amount of time that might otherwise be required to physically re-assemble an updated robot design is reduced or eliminated. Finally, the robot simulation server 130 can enable a user to test the logic, artificial intelligence, or autonomous robot control program used to control a real-world robot but within a virtual environment, beneficially increasing the safety of such testing and reducing the amount of time that might otherwise be required to update the control program and upload/install it to a real-world robot, further reducing the time, cost, and resources otherwise required to physically test the logic used to control the robot and to gather data required for training machine learning models and AI for use in controlling the robot.

After the user simulates the design of the structure and behavior of one or more robots within a virtual environment, the user can select an optimal design from the simulated designs. For instance, the user may select a design that performed best under certain circumstances, that performed best overall, that is the least expensive to produce while still satisfying one or more criteria, or based on any other suitable factors. The user can then build a robot in the real-world based on the selected design. Likewise, the user can use information gathered during the simulation of various robot designs to refine an existing robot design.

Robot Simulation Server

Figure 2:
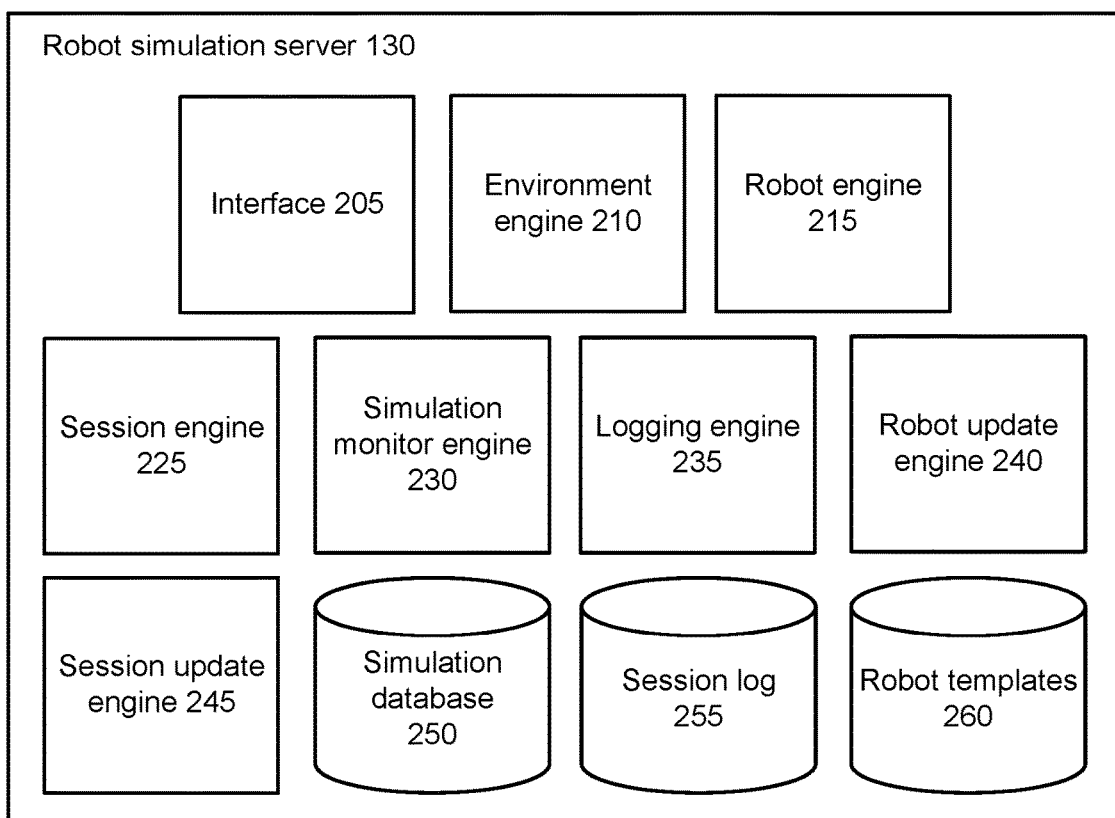
FIG. 2 is a block diagram of a robot simulation server, according to one embodiment.

FIG. 2 is a block diagram of a robot simulation server 130, according to one embodiment. In the embodiment of FIG. 2, the robot simulation 130 includes an interface module 205, an environment engine 210, a robot engine 215, a session engine 225, a simulation monitor engine 230, a logging engine 235, a robot update engine 240, a session update engine 245, a simulation database 250, a session log 255, and a robot templates storage module 260. In alternative configurations, different and/or additional components may be included in the robot simulation server 130.

The interface module 205 provides a communicative interface between entities within the environment 100, between users 105 and 120 (via the primary client device 110 and the user-controlled client devices 115, respectively) and the robot simulation server 130, between multiple components of the simulation server 130, and between components of the simulation server and entities within the environment 100. The interface module 205 enables communications within the environment 100 by implementing any data transfer protocols necessary for communications between the various entities and components of the environment.

The interface module 205 can also provide a user interface that allows users (such as the user 105 and users 120) to interact with the robot simulation server 130. Through various elements of the user interface, such as graphical user interfaces displayed by a client device (such as the primary client device 110 and the user-controlled client devices 115), a user can initialize, customize, begin, run, and monitor a robot simulation session. Likewise, through the user interface, the users 105 and 120 can control one or more virtual robots, can view and interact with a virtual environment (e.g., by manipulating, in real-time during a simulation, a portion of the virtual environment, an object within the environment, etc. to test, for instance, how a robot's autonomous control logic will handle a human jumping in front of the robot during the simulation session), can monitor the autonomous control of one or more virtual robots and can intervene to assume manual control of the virtual robots, can monitor data associated with a structure or behavior of one or more virtual robots, and can re-customize one or more virtual robots and/or re-run a portion of the robot simulation.

Virtual Environment and Virtual Robot Instantiation

The environment engine 210 instantiates and generates a virtual environment in which robot structure and behavior can be simulated. As used herein, "virtual environment" refers to a computer-rendered representation of reality. The virtual environment includes computer graphics representing objects and materials within the virtual environment, and includes a set of property and interaction rules that govern characteristics of the objects within the virtual environment and interactions between the objects. In some embodiments, the virtual environment is a realistic (e.g., photo-realistic, spatial-realistic, sensor-realistic, etc.) representation of a real-world location, enabling a user (such as the user 105) to simulate the structure and behavior of a robot in a context that approximates reality.

The properties, characteristics, appearance, and logic representative of and governing objects (such as people, animals, inanimate objects, buildings, vehicles, and the like) and materials (such as surfaces, ground materials, and the like) for use in generating a virtual environment can be stored in the simulation database 250. Accordingly, when the environment engine 210 generates a virtual environment, an object selected for inclusion in the virtual environment (such as a park bench, or a sandy beach) can be accessed from the simulation database 250 and included within the virtual environment, and all the properties, characteristics, appearance, and logic for the selected object can succinctly be instantiated in conjunction with the selected object. In some embodiments, a user (such as the user 105) can manually generate an object for inclusion in the virtual environment (for instance, by uploading a CAD file representative of a structure of the object, by customizing various properties of the object, and the like), and the manually generated object can be stored by the environment engine 210 in the simulation database 250 for subsequent use in generating virtual environments.

The environment engine 210 can include a graphics or rendering engine ("graphics engine" hereinafter) configured to generate the virtual environment. The graphics engine can, using one or more graphics processing units, generate three-dimensional graphics depicting the virtual environment, using techniques including three-dimensional structure generation, surface rendering, shading, ray tracing, ray casting, texture mapping, bump mapping, lighting, rasterization, and the like. In some embodiments, the graphics engine includes one or more rendering APIs, including but not limited to Direct3D, OpenGL, Vulkan, DirectX, and the like. The rendering engine can, using one or more processing units, generate representations of other aspects of the virtual environment, such as radio waves within the virtual environment, GPS signals within the virtual environment, and any other aspect of the virtual environment capable of detection by a virtual sensor.

The environment engine 210 can also include a physics engine configured to generate and implement a set of property and interaction rules within the virtual environment. In practice, the physics engine implements a set of property and interaction rules that mimic reality. The set of property rules can describe one or more physical characteristics of objects within the virtual environment, such as characteristics of materials the objects are made of (like weight, mass, rigidity, malleability, flexibility, temperature, and the like). Likewise, the set of interaction rules can describe how one or more objects (or one or more components of an object) interact (for instance, describing a relative motion of a first object to a second object, a coupling between objects or components, friction between surfaces of objects, and the like). The physics engine can simulate rigid body dynamics, collision detection, soft body dynamics, fluid dynamics, particle dynamics, and the like. Examples of physics engines include but are not limited to the Open Dynamics engine, Bullet, PhysX, the Havok engine, and the like.

In some embodiments, the environment engine 210 utilizes existing game engines (which include graphics and physics engines) in order to generate a virtual environment. In some embodiments, the environment engine 210 generates the virtual environment using one or more of: the Unreal Engine, Unity, GameMaker, Godot, AppGameKit, and CryEngine. In addition, the environment engine 210 can include sound engines to produce audio representative of the virtual environment (such as audio representative of objects within the virtual environment, representative of interactions between objects within the virtual environment, and representative of ambient or background noise within the virtual environment). Likewise, the environment can include one or more logic engines that implement rules governing a behavior of objects within the virtual environment (such as a behavior of people, animals, vehicles, or other objects generated within the virtual environment that are controlled by the robot simulation server 130 and that aren't controlled by users such as user 105 and users 120).

The virtual environment generated by the environment engine 210 can include one or more ground surfaces, materials, or substances (such as dirt, concrete, asphalt, grass, sand, water, and the like). The ground surfaces can include roads, paths, sidewalks, beaches, and the like. The virtual environment can also include buildings, houses, stores, restaurants, and other structures. In addition, the virtual environment can include plant life, such as trees, shrubs, vines, flowers, and the like. The virtual environment can include various objects, such as benches, stop signs, crosswalks, rocks, and any other object found in every-day life. The virtual environment can include representations particular location types, such as city blocks in dense urban sprawls, residential neighborhoods in suburban locations, farmland and forest in rural areas, construction sites, lakes and rivers, bridges, tunnels, playgrounds, parks, and the like. In practice, the virtual environment generated by the environment engine 210 can include a representation of any area within which a user (such as the user 105) wants to simulate the structure and behavior of a robot. It should be noted that in addition to identifying types of objects within the virtual environment, a user 105 may specify a location within the virtual environment at which the various objects within the virtual environment are located. In addition, the virtual environment can include representations of various weather conditions, temperature conditions, atmospheric conditions, and the like, each of which can, in an approximation of reality, affect the movement and behavior of robots during a robot simulation session.

The environment engine 210 generates a virtual environment in response to a request to simulate robot structure and behavior (for instance, in response to a request from the user 105 to begin a robot simulation session). In some embodiments, the environment engine 210 generates a default virtual environment in response to a request to simulate robot structure and behavior. In other embodiments, the environment engine 210 can suggest a virtual environment including a particular location type (e.g., city block, forest, etc.), for instance based on a type of robot to be simulated, based on similar virtual environments generated for the user 105, based on similar virtual environments generated for users similar or related to the user 105, and the like. Likewise, the environment engine 210 can suggest various types of objects for rendering within the virtual environment, based on a property of a robot being simulated, the user 105, users similar or related to the user 105, and the like. The user 105 can select various characteristics of the virtual environment suggested by the environment engine 210, or can manually customize the virtual environment, and the environment engine can, in response, generate the virtual environment according to the characteristics and/or customizations selected by the user. In some embodiments, the environment engine 210 can generate a virtual environment based on rules and distribution parameters set by the user at a prior time. These rules may examine previous simulations (via previous simulation logs) or a scenario library (describing various pre-defined virtual environments) for instance in response to identifying deficiencies in testing a particular virtual environment, condition, or scenario, and can generate a virtual environment to address the identified deficiencies.

The robot engine 215 instantiates and generates one or more robots within the virtual environment generated by the environment engine 210. Each robot generated by the robot engine 215 comprises a robot being simulated within a robot simulation session for control by clients running on one or more of the primary client device 110, the user-controlled client devices 115, and the machine-controlled client devices 125. The robot engine 215 generates a robot by rendering computer graphics representing the robot within the virtual environment, and implementing a set of property and interaction rules that govern characteristics of the robot and interactions between the robot and other robots or objects, structures, and surfaces within the virtual environment. It should be noted that the robot engine 215 can also generate robots that are controlled by the robot simulation server 130.

The properties, characteristics, appearance, and logic representative of and governing robots and robot components can be stored in the simulation database 250. Accordingly, when the robot engine 215 generates a virtual robot, one or more robot components can be selected from the simulation database 250, and all the properties, characteristics, appearance, and logic for the selected robot components can succinctly be included in the instantiating of the robot. In some embodiments, a user (such as the user 105) can manually generate a robot component (for instance, by uploading a CAD file representative of a structure of the robot component, by specifying various materials of the robot component, by specifying the dimensions and shape of the component, and the like), and the manually generated robot component can be stored by the robot engine 215 in the simulation database 250 for subsequent use in generating virtual robots.

The robot engine 215 can generate robots using graphics engines, physics engines, and/or game engines, including any of the engines described above. Each generated robot includes a set of robot components that are coupled together to form the structure of the robot (such as frame components, base components, arm components, cab components, and the like). Likewise, each generated robot can include one or more components configured to interact with other components of the robot (such as two components that are configured to rotate relative to one another, a tread component configured to rotate around a wheel base component, and the like). Each generated robot can include or more end-effector components configured to perform one or more functions with regards to the virtual environment (such as a scoop component configured to scoop dirt and sand, a drill component configured to break up materials within the virtual environment, a gripper or claw component, and the like) (collectively, "effector components" or "effectors" hereinafter).

Each generated robot can include one or more components configured to enable the robot to perform a function or operation (such as an engine component, wheels, propellers, and the like). Each generated robot can include a set of virtual sensors, configured to capture data representative of a state, condition, or property of the robot, of other robots, of objects within the virtual environment, or of the virtual environment itself (such as cameras, a LIDAR, a radar, an ultrasonic sensor, a capacitive sensor, a depth sensor, a motion detector, a temperature sensor, a pressure sensor, a microphone, speakers, and the like).

In some embodiments, the robot engine 215 generates one or more robots requested by the user 105. For instance, the user 105 may request two autonomous automobile robots, one manually controlled automobile robot, two delivery truck robots, four drone robots, and one excavator robot, and the robot engine 215, in response to the request, generates each of the requested robots. Alternatively, the user 105 may request an autonomous automobile robot and a virtual environment representative of a city block, and the robot engine 215 may generate the requested autonomous automobile robot and a set of additional robots representative of vehicles that might be expected in a real city block. In some embodiments, the robots are instantiated at locations within the virtual environment specified by the user 105, while in other embodiments, the locations of the instantiated robots within the virtual environment are selected by the robot engine 215.

The user 105 may request a robot by specifying particular components and functions of the robot. For instance, the user 105 may request an automobile of a particular dimension, with exterior panels made of a particular material, and that is battery-powered. Likewise, the user 105 may request an excavator with a particular arm length, a particular lift capacity, and a particular horsepower. In response to a user request, the robot engine 215 can generate virtual robots customized according to the request. In some embodiments, the robot engine 215 can suggest a set of robot templates to the user 105, for instance each specifying one or more of: a robot base type, a robot body type, one or more robot attachments, one or more robot effectors, and one or more robot sensors. In response, the user 105 can select a displayed template and can customize the robot corresponding to the selected template according to the user's needs (for instance, specifying a mass of various components, an amount of power available to the robot, and the like). Alternatively, the user 105 can generate a new robot template, or the robot engine 215 can generate a robot template from a robot manually created and customized by the user. Robot templates can be stored within the robot templates storage module 260 for subsequent access by the robot engine 215. The creation and use of robot templates in instantiating robots within the virtual environment are described below in greater below.

It should be noted that the user 105 can customize other portions of the robot simulation session as well. For instance, the user 105 can select a top speed for each robot within the virtual environment, can select an initial position and orientation for each robot or object within the virtual environment, can select an initial speed for each robot within the virtual environment, can select a mission or goal of an autonomously controlled robot within the virtual environment, and the like. Likewise, the user 105 may select a virtual fuel amount available to each robot within the virtual environment, representing an amount of fuel that might be available to a real-world counterpart to each virtual robot. The user 105 may select a number of traffic lights within the virtual environment, a size and scope of the virtual environment, a color and shape of objects within the virtual environment, an orientation or behavior of object within the virtual environment, a number of people within the virtual environment, environmental conditions within the virtual environment, a level of noise within the environment (e.g., audible noise, sensor signal noise), and the like. The user 105 may select various scenarios within the virtual environment, for instance a footrace down a road within the virtual environment, a fire within a building of the virtual environment, a rescue operation within the virtual environment, a pedestrian crossing a street within the virtual environment, a pedestrian stepping in front of a moving vehicle within the virtual environment, and the like. The environment engine 210 and the robot engine 215, in response to customization selections or requests to the virtual environment or the virtual robots within the virtual environment, can modify the virtual environment or the virtual robots to reflect these customizations.

In some embodiments, the creation of a virtual environment and virtual robots within the virtual environment is done by implementing layers. As used herein, "layer" refers to a set of definitions (such as attribute definitions) corresponding to a portion of the virtual environment or one or more robots. For instance, a ground surface layer can be defined by the environment engine 210, a building layer defining buildings within the virtual environment can be defined relative to the ground surface layer, an object layer defining objects within or relative to the buildings can be defined relative to the building layer, and the like. Likewise, a robot base layer can be defined by the robot engine 215, a robot body layer defining the robot's body can be defined relative to the robot base layer, one or more robot attachment layers can be defined relative to the robot body layer, and the like. By rendering portions of the virtual environment and the virtual robots using layers, customizations by the user 105 can be quickly implemented by modifying only the layers corresponding to the customizations, preventing the need to re-generate all layers within the virtual environments or the virtual robots. Likewise, robot behavior can be modified non-destructively by adding partial layer definitions, for example, changing sensor position and rotation, without specifying the rest of the robot or sensor behavior. Layers also allow the customization of a robot by adding an incremental layer adjusting one or more characteristics or parameters of the robot on top of the robot definition.

Figure 3:
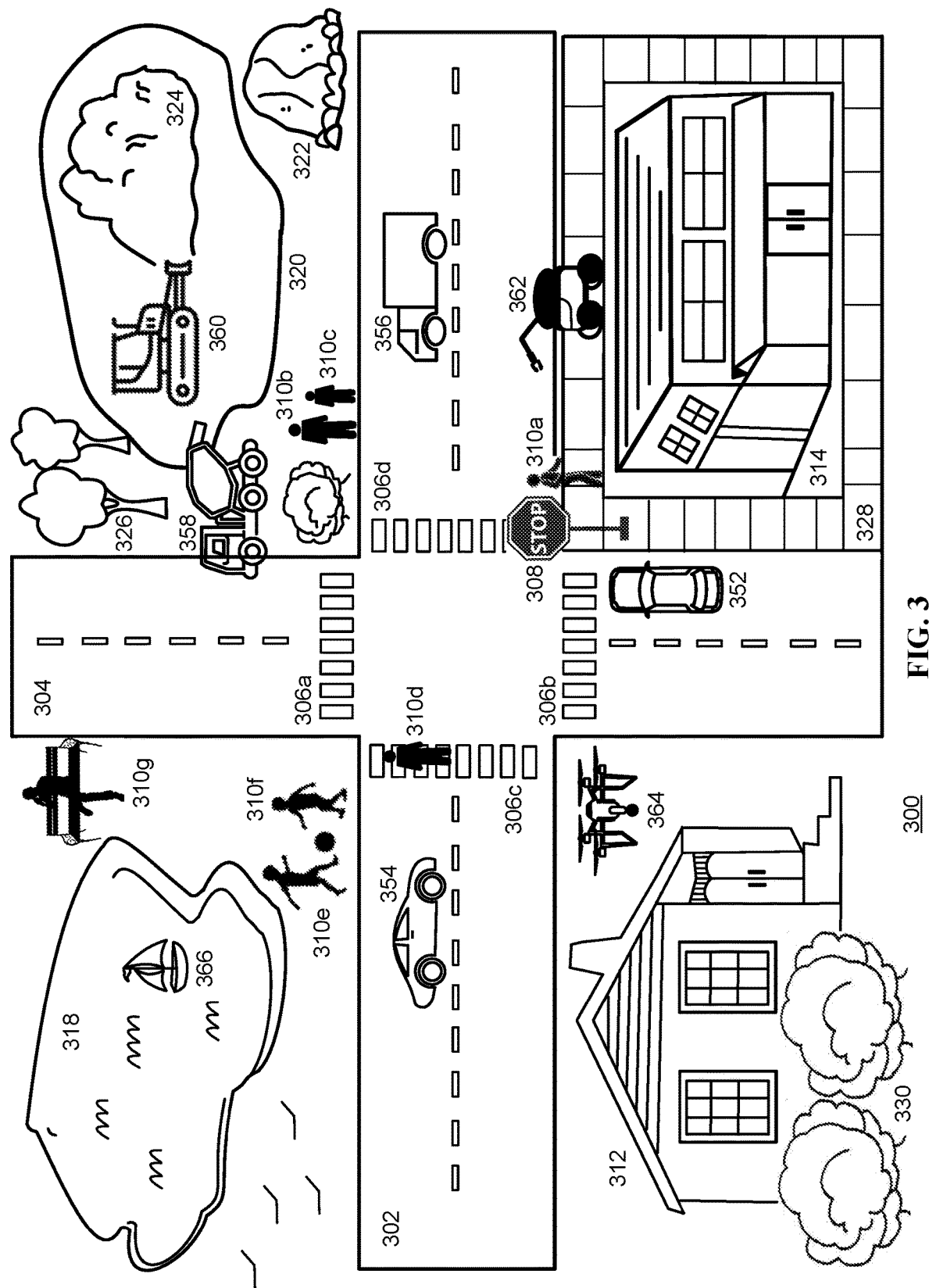
FIG. 3 illustrates a set of virtual robots instantiated within a virtual environment by a robot simulation server, according to one embodiment.

FIG. 3 illustrates a set of virtual robots instantiated within a virtual environment by a robot simulation server 130, according to one embodiment. It should be noted that the embodiment of FIG. 3 is just one example of a virtual environment and virtual robots, presented for illustrative purposes. In other embodiments, different types of virtual environments with different objects can be generated, and a different set of virtual robots (including more, fewer, and different virtual robots than those illustrated in FIG. 3) can be generated within the virtual environment.

In the embodiment of FIG. 3, the virtual environment 300 generated by the environment engine 210 is representative of a city block, and includes two different intersecting roads, road 302 and road 304. The roads include various features, such as crosswalks 306a-306d, lane lines (not numbered), and the stop sign 308. Each of roads 302 and 304 bi-sect the virtual environment, creating four non-road portions of the virtual environment.

The environment engine 210 populates a first non-road portion of the virtual environment with a house 312, populates a second portion with a place of business 314 (such as a grocery store), populates a third portion with a lake 318, and populates a fourth portion with a construction site 320. The environment engine 210 further instantiates various people within the virtual environment 300, such as persons 310a-310g. The environment engine 210 also instantiates other objects within the virtual environment, such as the rock 322, the dirt pile 324, the trees 326, the sidewalk 328, and the shrubs 330. Finally, although not numbered within FIG. 3, the environment engine 210 can instantiate various ground types within the virtual environment 300, such as a dirt ground type within the construction site 320, a grass ground type around the house 312, and a sand ground type around the lake 318.

In the embodiment of FIG. 3, various robots are generated by the robot engine 215 within the virtual environment 300. For instance, the robot engine 215 instantiates various road vehicles, such as the autonomous automobile 352, the user-driven automobile 354, and the delivery truck 356. Likewise, the robot engine 215 instantiates various construction vehicles, such as the autonomous cement mixer 358 and the autonomous bulldozer 360. Finally, the robot engine 215 instantiates other robots, such as the sidewalk delivery robot 362, the drone 364, and the autonomous boat 366. Note that the robot engine 215 can also generate robots, people, and objects within the virtual environment 300 that are not controlled by a client, and are instead controlled directly by the robot simulation server 130.

The locations and types of each of the objects, structures, ground types, people, and robots within the virtual environment 300 can be selected by a user, such as the user 105. As described below, these locations and types of objects, robots, and the like can be included within a request to simulate robot structure and behavior, can be selected by the user when initializing a robot simulation session, and can be customized by the user as needed.

Robot Simulation Session Initialization and Execution

Returning to FIG. 2, the session engine 225 enables the creation and execution of a robot simulation session. In particular, the session engine 225 can receive a request from the user 105 to simulate robot structure and behavior, and can initialize a robot simulation session in response. In some embodiments, the initialization of a robot simulation session includes receiving simulation session parameters from the user 105, such as virtual environment parameters and robot parameters, and the session engine 225 coordinates with the environment engine 210 and the robot engine 215 to instantiate a virtual environment and one or more robots within the virtual environment, respectively, based on the received simulation session parameters.

After the virtual environment and the one or more robots have been generated, the session engine 225 establishes a communicative connection between each of the one or more robots (and people, objects, and other agents to be controlled by a client) and clients running on one or more of the primary client device 110, the user-controlled client devices 115, and the machine-controlled client devices 125. After the robots have been instantiated within the virtual environment, but before control of the robots has been provided to the clients, the robots may be referred to as "pawns". Each pawn may be stationary within the virtual environment until control of the pawn has been provided to a client.

The session engine 225 selects a client to control each robot during the robot simulation session, enabling data detected by the virtual sensors of each robot to be provided for display or presentation to a user of a corresponding client or an autonomous robot control program (such as camera data, audio data, lidar data, joint angle data, and the like), and enabling inputs provided by the users of the clients (or the autonomous robot control program) to be provided to the session engine 225 in order to control the movement and behavior of the robots. For example, in a robot simulation session that includes three robots, control of a first robot may be provided to a client running on the primary client device 110 for control by the user 105, control of a second robot may be provided to a client running the a user-controlled client device 115 for control by a user 120, and control of a third robot may be provided to a client running on a machine-controlled client device 125 for control by an autonomous robot control program running on the machine-controlled client device.

In some embodiments, the user 105 selects the clients or client devices to which control of the various instantiated robots (or people, objects, and other user-controlled entities within the virtual environment) is to be provided. In some embodiments, the user 105 specifies a type of robot control (e.g., human operation, machine-controlled operation), and the session engine 225 selects clients accordingly. After control of each instantiated robot has been provided to a corresponding client (or after control of a threshold number of robots has been provided), the session engine 225 can begin the simulation session. In some embodiments, the user 105 is prompted to begin the simulation session, while in other embodiments, the simulation session can begin automatically after control of the instantiated robots has been assigned.

After the robot simulation session has begun, the session engine 225 manages the simulation session by moving and simulating behavior for the robots within the virtual environment based on inputs received from the one or more clients to which control of the robots has been assigned. For instance, if a first user instructs a first robot (an automobile) via a client corresponding to the first robot to move forward down a road within the virtual environment, the session engine 225 simulates the movement of the first robot down the road, by moving the first robot forward along the road within the virtual environment. In such an embodiment, the virtual sensors of the first robot (such as cameras positioned to observe a field of view out a windshield of the automobile that a driver of the automobile might see) transmit data representative of a context, state, or surroundings of the first robot (such as a video field of the field of view in front of the automobile as it moves down the road) observed by the virtual sensors to the client controlling the first robot for display (for instance, to a user of the client). It should also be noted that in some embodiments, part or all of the computation performed by the virtual sensors is performed by the client controlling the robot associated with the virtual sensors. This can beneficially reduce the computational load required by the robot simulation server 130. In some embodiments, data captured by the virtual sensors can subsequently be provided to the robot simulation server 130, for instance in order to produce a session log representative of the simulation session.

Likewise, the session engine 225 may receive input from an autonomous robot control program running on a machine-controlled client device 125 controlling a second robot within the virtual environment, such as an autonomous bulldozer. The received input may instruct the second robot to perform an operation, such as clearing away a pile of rubble within the virtual environment. In response, the session engine 225 simulates the movement of the second robot based on the received input, and simulates the movement of rubble as the second robot is simulated to make contact with the pile of rubble. For instance, in accordance with the received input, the bulldozer can be simulated to line up with the pile of rubble, to lower a bulldozer blade close to the ground of the virtual environment, to drive forward into the pile of rubble, and to simulate the movement of the portion of the pile of rubble aligned with the bulldozer blade away from the bulldozer blade as though the bulldozer blade and rubble were real. The received inputs can instruct the bulldozer to move forward by a specified distance in each clearing sweep, can instruct the bulldozer to iterate through the bulldozing process a specified number of times, or can instruct the bulldozer to continue to iterate through the bulldozing process until a specified condition is satisfied (e.g., the pile of rubble is cleared). Likewise, the received inputs can be actuator-specific instructions (e.g., set throttle to 50%, turn front wheels 30 degrees to the right, apply brakes by 20%, set motor speed to 2100 rpm, set tract rotations to 10 rpm, etc.)

The session engine 225 thus simulates movement and behavior of each robot simulated within the virtual environment. In some embodiments, multiple "players" (the clients, users, or autonomous robot control programs) control the robots within a sandbox-type virtual environment during the robot simulation session. The virtual environment (including each structure, surface, material, or object within the virtual environment) is updated in real-time as the robots move and perform various functions within the virtual environment. When a robot makes contact with an object within the virtual environment, the object can move or react to the contact, for instance representative of such contact between a robot and an object in the real-world. Likewise, the session engine 225 can simulate interactions or collisions between robots within the virtual environment. For instance, if a first robot runs into a second robot within the virtual environment, the appearance or functionality of one or both of the first robot and the second robot within the virtual environment can be affected (e.g., structural damage to a robot can be rendered, functionality of a robot can be impaired, and the like). Likewise, the session engine 225 can simulate constructive interactions between robots. For instance, an excavator robot can be instructed to scoop dirt from a virtual construction site and empty the dirt into a hauler robot, which can be instructed to position itself adjacent to the excavator robot when empty, and to drive to a dump site when full. It should be noted that in some embodiments, instead of the session engine 225 simulating robot movements and behavior based on inputs received by the clients, the clients themselves simulate robot movement and behavior, and simulate environmental interactions (such as the movement of rubble described above). In such embodiments, the robot simulation server 130 receives inputs from the clients describing the robot movement and behavior, and the environmental interactions, and simply synchronizes the robot behavior and movement and environmental interactions between all of the clients.

The session engine 225 can continue the robot simulation session until one or more criteria to end the simulation session are met. In some embodiments, the criteria to end the simulation session are provided by the user 105 when the simulation is requested. In other embodiments, the criteria to end the simulation session are default criteria, are provided by the robot simulation server 130, are based on a type or number of robots within the simulation session, are provided by the users 120, are based on a type of virtual environment, or are provided by any other suitable entity.

In some embodiments, the criteria to end the simulation session include a time-based criteria. For instance, the simulation session can be configured to run for a threshold amount of time (such as 60 seconds, 10 minutes, 30 minutes, or any other suitable interval of time). In some embodiments, the criteria to end the simulation session include safety or collision criteria. For instance, the simulation session can be configured to run until a virtual pedestrian is struck by a robot within the virtual environment, until two robots collide, until a robot collides with an object or structure within the virtual environment, and the like. In some embodiments, the criteria to end the simulation session include immobilization criteria. For instance, the simulation session can be configured to run until a robot becomes disabled, until a robot runs out of virtual fuel, until a robot becomes stuck within a medium of the virtual environment (such as sand or mud), until a robot is overturned or becomes stuck (e.g., within a hole, between buildings within the virtual environment, and the like), or based on any other criteria.

In some embodiments, the criteria to end the simulation session include threshold criteria. For instance, the simulation session can be configured to stop when a threshold distance has been traversed by one or more robots (either individually or collectively) within the virtual environment, when a threshold number of actions has been performed by the robots within the virtual environment (such as a threshold number of traffic stops, a threshold number of parcels delivered, and a threshold number of robot effector operations performed), or when a threshold amount of the virtual environment (for instance, roads within the virtual environment, ground surface within the virtual environment, and the like) has been traversed by the robot. In some embodiments, the criteria to end the simulation session include intervention criteria. For instance, the simulation session can be configured to stop when or a threshold amount of time after a human intervenes and takes control of a robot from an autonomous robot control program. In some embodiments, the criteria to end the simulation session include participation criteria. For instance, the simulation session can be configured to stop when one or more users (such as user 105 and users 120) disconnect from the simulation session. It should be noted that in such embodiments, instead of stopping the robot simulation session, the robot simulation server 130 or a client device (such as client devices 110, 115, or 125) or the robot simulation server 130 can implement an autonomous robot control program to autonomously control the robot corresponding to each disconnected user for the remainder of the simulation session. In some embodiments, the simulation session can run until the user 105 or any other entity instructs the robot simulation server 130 to end the simulation session.

It should be noted that the robot simulation sessions described herein differ from the use of "bots" within a sandbox environment. In particular, "bots" in video game contexts are controlled by the system that instantiates the virtual environment in which the bots are generated. In contrast, the robot simulation sessions described herein may include robots that are autonomously controlled, but the control of these robots is provided by one or more clients (such clients running on the machine-controlled client devices 125) running on systems remote from the system that instantiates the virtual environment (the robot simulation server 130 of the embodiment of FIG. 2).

Robot Simulation Session Monitoring and Logging

The simulation monitor engine 230 is configured to monitor the state of each robot during a robot simulation session. For instance, the simulation monitor engine 230 can monitor the location, orientation, direction, and speed of each robot within the virtual environment for the entirety of the robot simulation session. Likewise, the simulation monitor engine 230 can monitor operations performed by each robot. For instance, the simulation monitor engine 230 can monitor parcel delivery operations, construction operations, driving operations, flight maneuvers, and the like for each robot within the virtual environment. The simulation engine 230 can monitor interactions between each robot in the virtual environment. For instance, the simulation monitor engine 230 can monitor contact between the robots and people, objects, or structures within the virtual environment, or can monitor contact between the robots and one or more mediums within the virtual environment (such as sand, dirt, water, and snow). The simulation engine 230 can also monitor interactions between robots within the virtual environment. The simulation monitor engine 230 can monitor a context of each monitored operation, interaction, and behavior. For instance, the simulation monitor engine 230 can monitor the surroundings of a robot performing an operation within the virtual environment, an orientation and position of objects within a proximity of the robot, and a time interval during which the operation is performed.

The simulation monitor engine 230 can provide monitored data to a user, such as the user 105 or the users 120. For instance, the simulation monitor engine 230 can provide video streams of robots within the virtual environment, measurement data representative of a state of the monitored robots (such as engine temperatures, fuel levels, robot component stress/force, and the like), or data corresponding to a robot's virtual sensors (in embodiments where sensor data is generated by the robot simulation server 130). In some embodiments, the simulation monitor engine 230 provides summary data to a user, such as a number of robots in a particular portion of the virtual environment, a number of interactions between robots, and the like. In some embodiments, the simulation monitor engine 230 provides anomaly data to a user, such as a data representative of collisions between robots, data representative of disabled robots, data representative of contact between a robot and one or more objects within the virtual environment, and the like.

The simulation monitor engine 230 can provide the monitored data to a user (such as the user 105) within an interface, such as a GUI displayed by a client device (such as the primary client device 110). The interface can be configured to allow for viewing one or more video streams, sensor data streams, robot system or component measurement streams, and the like. In some embodiments, a user can toggle between viewing monitored data corresponding to one robot and viewing monitored data corresponding to multiple robots or all robots within the virtual environment. In some embodiments, the interface can include a map interface representative of the virtual environment. The map interface can include a location of each robot within the virtual environment, and can be updated in real-time to reflect the real-time movement of the robots within the virtual environment. The map interface can further include a location of objects within the virtual environment, and can include information detailing a state of each robot or object.

In some embodiments, the interface displaying monitored data can include a set of interface elements (such as icons, buttons, a list of entries, and the like) that enable a user of the interface to quickly switch between interface views. For instance, if a user clicks on a first icon corresponding to a first robot, monitored data corresponding to the first robot can be displayed within the interface, and when the user subsequently clicks on a second icon corresponding to a second robot, monitored data corresponding to the second robot can instead be displayed within the interface, beneficially enabling a user to quickly switch between perspectives while monitoring a robot simulation session.

In some embodiments, the simulation monitor engine 230 can prioritize the display of certain types of data within an interface. For instance, the simulation monitor engine 230 can implement a set of monitoring rules each detailing a condition that, when satisfied by one or more robots and/or one or more objects within the virtual environment, cause information representative of the rule and the robots or objects that satisfied the condition of the rule to be prominently displayed or prioritized within the interface. For example, the simulation monitor engine 230 can implement a first rule such that when a robot exceeds a threshold speed within the virtual environment, the interface is modified to include a warning indicating that the threshold speed has been exceeded by the robot. Likewise, the simulation monitor engine 230 can implement a second rule such that when a robot makes contact with a person within the virtual environment, the interface is modified to include a warning indicating the contact with the person.

In some embodiments, monitored information is displayed within a feed or listing that is updated in real-time. The feed can display monitored information chronologically, based on a time within the robot simulation session associated with the information. However, the feed can also be modified to prioritize the display of information associated with monitoring rules, enabling such information (such as the exceeding of the speed threshold or the contact with a person within the virtual environment described above) to be displayed at the top of the feed. In some embodiments, prioritized monitored information can be displayed in a different font or color, can be displayed as pop-ups overlaid on the interface, or can be displayed in a dedicated "warning" or "priority information" portion of the interface.

In some embodiments, the simulation monitor engine 230 can, in conjunction with displaying monitored information to a user (such as the user 105), enable the user to perform one or more actions with regards to the simulation. For instance, the simulation monitor engine 230 can enable the user to stop or pause the simulation, can enable the user to re-assign control of one or more robots to a different entity (e.g., a different user 120 or a different machine-controlled client device 125), can enable the user to assume control of a robot within the virtual environment, can enable the user to record monitored information, can enable the user to make changes to the virtual environment, can enable the user to replay or re-simulation one or more portions of the robot simulation session (described below in greater detail), can enable the user to make a change to one or more robots during the robot simulation session (described below in greater detail), and the like.

In some embodiments, each action that the simulation monitor engine 230 enables the user to perform is associated with an interface element displayed within an interface displaying the monitored information. For instance, each action can be associated with a selectable button that, when selected by the user, causes the associated action to be performed. In some embodiments, the simulation monitor engine 230 enables certain actions to be performed when one or more monitoring rules are satisfied. For instance, if a collision between robots is detected, the simulation monitor engine 230 can, in response, enable the user to view a video feed corresponding to the collision, to identify circumstances within the virtual environment that led to the collision, to save data corresponding to the collision, and the like.

The logging engine 235 captures data representative of the robot simulation session and stores the captured data in the session log 255. Examples of captured data include one or more of data representative of movement of robots within the virtual environment, interactions between robots within the virtual environment, and interactions between the robots and the virtual environment. In addition, captured data can be associated and stored in association with a time within the robot simulation session at which the data was captured. In some embodiments, the logging engine 235 can additionally store one or more of monitored data produced by the simulation monitor engine 230, data representation of a state or position of virtual environment objects (including at the beginning of the robot simulation session, in real-time during the robot simulation session, and at the end of the robot simulation session), inputs received from one or more clients (such as clients running on the primary client device 110, the user-controlled client devices 115, and the machine-controlled client devices 125), and actions taken by users (such as the user 105 or the users 120) during the robot simulation session (such as simulation pauses, robot updates, simulation session updates, and the like).

The session log 255 can be reviewed to identify information representative of a robot simulation session, beneficially enabling users that simulate robot structure and behavior to evaluate the performance of the simulated robots during the simulation session. For instance, a user wishing to identify an optimal top speed or amount of battery power available to a robot can review the session log 255 to determine which of a range of top speeds or battery powers produced an optimal result (e.g., avoiding collisions, enabling sufficient user-control, satisfying a performance metric, and the like). Upon reviewing the session log 255, a user can change one or more properties or characteristics of a simulated robot (such as a type of arms included within the robot, a base type for the robot, a size or mass of the robot, one or more operations available to the robot, and the like) based on the simulation session data included within the session log, and can subsequently re-simulate the structure or behavior of the robot within the virtual environment. Likewise, the user can change one or more properties or characteristics of the virtual environment based on the data within the session log 255, and re-simulate robot structure or behavior within the updated virtual environment in a subsequent robot simulation session.

Figure 4:
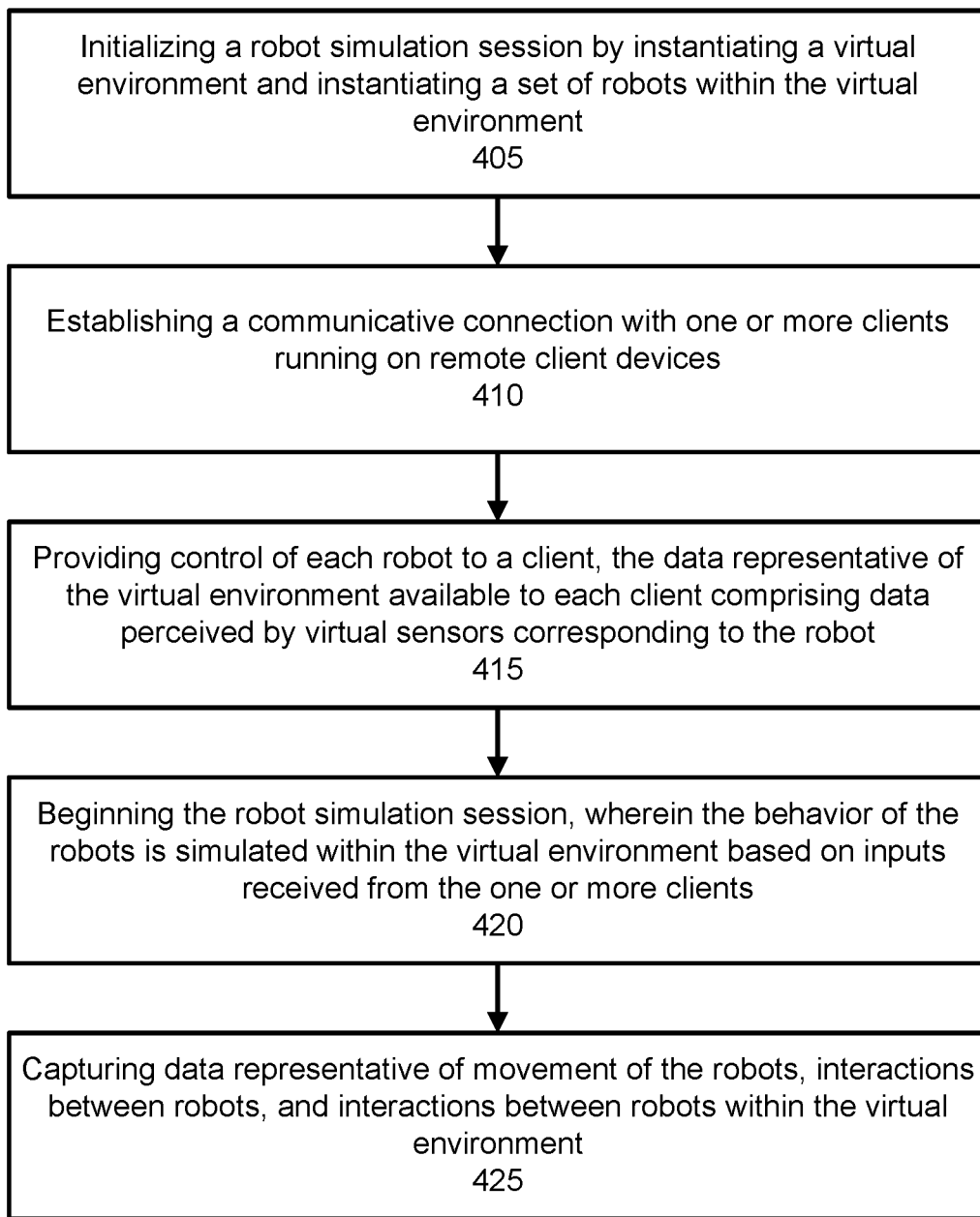
FIG. 4 is a flow chart illustrating a process of simulating robot behavior in a virtual environment, according to one embodiment.

FIG. 4 is a flow chart illustrating a process 400 of simulating robot behavior in a virtual environment, according to one embodiment. A robot simulation session is initialized 405, for instance by a robot simulation server. In some embodiments, initializing a robot simulation session includes instantiating a virtual environment approximating reality, and instantiating a set of robots within the virtual environment. A communication connection is established 410 with one or more clients running on client devices remote from the robot simulation server, such as clients running on user-controlled client devices, and clients controlled by autonomous robot control programs running on machine-controlled client devices.

Control of each robot within the virtual environment is provided 415 to a client. Data representative of the virtual environment available to each client can be limited to data perceived by virtual sensors of the robot controlled by the client (such as video streams from virtual cameras on the robot, sensor data representative of a state of the robot, and the like). The robot simulation session begins 420, and movement and behavior of the robots within the virtual environment is simulated based on inputs from the one or more clients controlling the robots. Data representative of the robots is captured 425 and logged, such as data representative of movement of the robots, interactions between robots, and interactions between robots and the virtual environment.

Robot Templates and in-Session Updates

As noted above, the robot engine 215 can suggest a set of robot templates to a user, such as the user 105. The templates can be presented to the user 105 within an interface generated by the robot engine 215, for instance in response to a request from the user 105 to initialize a robot simulation session and simulate the structure and/or behavior of a robot. By presenting templates to the user 105, the user is able to quickly create an initial robot to be simulated, thereby enabling the user to prioritize customizing the robot.

Each template can include a selection of one or more of: a robot base type, a robot body type, robot attachments, robot end-effectors (or simply "robot effectors"), and robot sensors. Example robot base types include: a 2-wheel base type with parallel wheels (e.g., side-by-side), a 2-wheel base type with aligned wheels (e.g., front and back wheels), a 4-wheel base type, a roller base type, a tread base type, a tract base type, a bipedal base type, a drone or aerial vehicle base type (e.g., a quadcopter type, a multi-rotor type), a boat or water vehicle base type, and a submersible vehicle base type. Example robot body types include: a sedan body type, a van body type, a truck body type, a delivery vehicle body type, a construction vehicle body type, a delivery robot body type, a drone or aerial vehicle body type, a humanoid body type, a cylindrical body type, a cubic or rectangular body type, a telepresence body type, a boat or water vehicle body type, non-passenger body types, and the like.

Example robot attachments include: robot arms, cabs, user interfaces, physical interface elements (such as switches, buttons, levers, steering wheels, and the like), scoops, doors, propellers, cranes, and storage compartments. Example robot effectors include: grippers, claws, robotic hands or pointers, drillers, buckets, blades, fins, flippers, wings, lights (such as warning lights or indicators lights), and speakers. Example robot sensors include: LIDAR sensors, radar sensors, cameras (such as single cameras, camera arrays, stereo cameras, and 360-degree cameras), GPS receivers, communication transceivers (such as broadcast antennae, wifi transceivers, Bluetooth transceivers, and the like), depth sensors, motion detectors, IMUS, gyroscopes, accelerometers, temperature sensors, pressure sensors, and weight sensors. In some embodiments, one or more of a robot base type, robot body type, robot attachment type, robot effector type, and robot sensor type have one or more sub-classes that a user can select. For example, a 4-wheel base type can have sub-classes including Ackerman steering, an articulated body, and the like.

For instance, a first robot template can include a 4-wheel base type, a sedan automobile body type, and a 360-degree camera sensor. Likewise, a second robot template can include a rolling tread base type, a delivery robot body type, a LIDAR sensor, and an arm with a gripper. Upon selecting a template from a template interface, the template can be modified to show a robot corresponding to the selected template (e.g., a robot including the base type, the body type, and the like specified by the template), and one or more interface elements can be displayed to the user 105 within the template interface enabling the user to customize the robot corresponding to the selected template.

For instance, the template interface can include interface elements that allow a user to customize the robot by specifying properties of the robot or each robot component, such as a mass, center of mass, shape, dimensions, appearance, materials of composition, and the like (referred to herein collectively as "customization parameters"). The template interface can include interface elements that allow a user to specify connections between robot components, such as coupling types, joint types, electrical connections, communicative connections, hydraulic connections, and the like. The template interface can include interface elements that allow a user to specify functions of the robot or each robot component, such as an available power, an available fuel, a strength (e.g., of an engine, an effector, etc.), a communicative capability, a speed or acceleration profile, a movement profile, a sensor function, and the like. The template interface can include interface elements corresponding to any other suitable property or characteristic of the robot or a robot component. Thus, a user can customize the properties, characteristics, and appearance of a robot created using a robot template.

In some embodiments, a user can create a new robot, for instance by selecting from various template components displayed within the template interface. For example, if a user wants to simulate the structure and behavior of a 2-wheeled autonomous, self-balancing personal transporter, but the robot templates storage module 260 does not store a template corresponding to such a robot, the user can select an interface element displayed within the template interface corresponding to the creation of a new template. The template interface can then display interface elements each corresponding to various template categories, such as robot base type, a robot body type, robot attachments, robot effectors, and robot sensors. In response to the selection of the robot base type interface element, the template interface can display a number of base types and, continuing with the previous example, the user can select the "2 parallel wheel" base type. In response to the selection of the robot body type interface element, the template interface can display a number of body types and, continuing with the previous example, the user can select the "handle bars" body type. When the user is done creating the new robot template, the robot template can be saved to the robot templates storage module 260 for future use, and the user can proceed to customize the new robot template. In some embodiments, the user can modify a robot template (for instance, by adding a robot arm to an existing template, or changing a type of virtual sensor within an existing template). In such embodiments, the modified robot template can be stored within the robot templates storage module 260 for subsequent use as a new template. In some embodiments, a robot created from a robot template and then customized can be stored in the robot templates storage module 260 as a customized robot instance. Users can subsequently access the customized robot instance for instantiation within a robot simulation session, or can modify the customized robot to create a new customized robot.

Figure 5A:
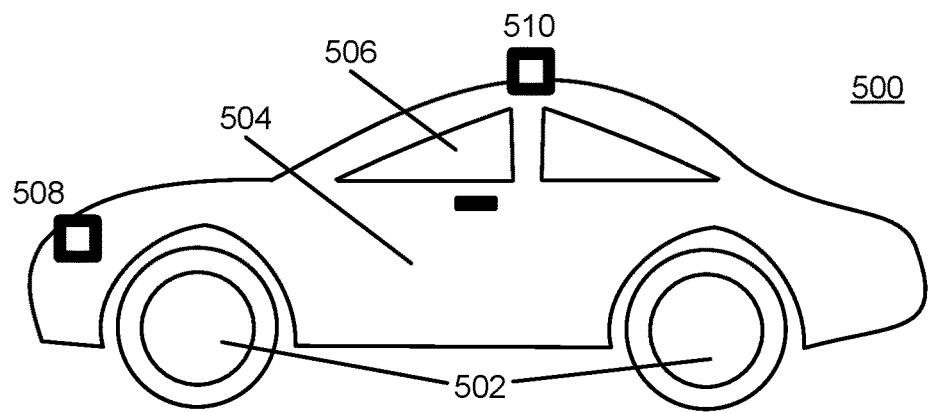
FIG. 5a illustrates an example automobile robot created from a robot template, according to one embodiment.
Figure 5B:
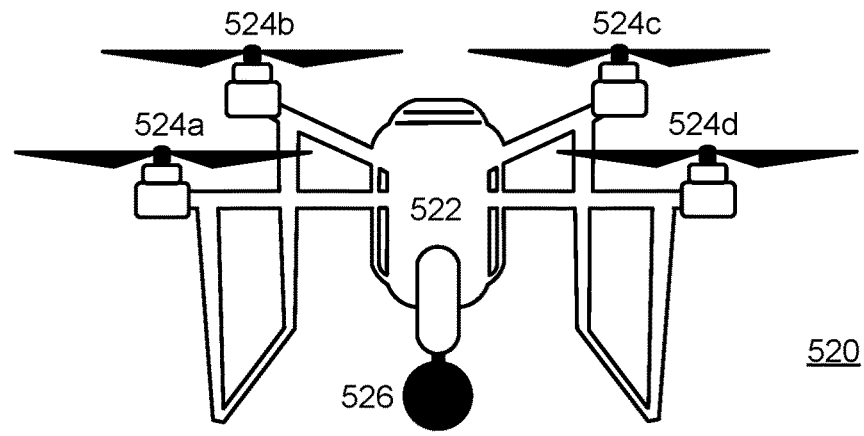
FIG. 5b illustrates an example drone robot created from a robot template, according to one embodiment.
Figure 5C:
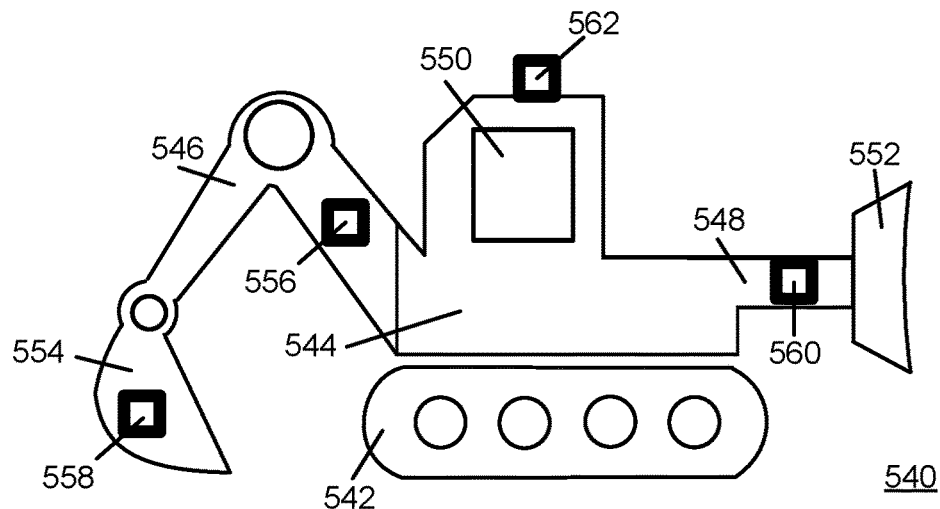
FIG. 5c illustrates an example construction robot created from a robot template, according to one embodiment.

FIGS. 5a-5c illustrate various customized robots created from robot templates. In particular, FIG. 5a illustrates an example automobile robot 500 created from a robot template, according to one embodiment. In the embodiment of FIG. 5a, the automobile robot 500 is built from a template that specifies a 4-wheel base 502, a sedan body 504, and a sedan cab 506. A user has further customized the instance of the automobile robot 500, for instance by including a LIDAR sensor 508 on the front of the automobile robot and a 360-degree camera sensor 510 on the top of the automobile robot. Further customizations that might not be apparent from the embodiment of FIG. 5a include user-specified dimensions of the automobile robot 500, user-specified automobile robot materials (e.g., an aluminum frame, carbon exterior panels, etc.), user-specified capabilities (e.g., engine type, engine horsepower, available fuel, etc.), and a user-selected color.

FIG. 5b illustrates an example drone robot 520 created from a robot template, according to one embodiment. In the embodiment of FIG. 5b, the drone robot 520 is built from a template that specifies a drone body 522 and four propeller arms 524a, 524b, 524c, and 524d. A user has further customized the drone robot 520, for instance by including a 360-degree camera sensor 526 mounted from the bottom of the drone robot. Further customizations that might not be apparent from the embodiment of FIG. 5b include user-specified weight of the drone robot 520, user-specified arm length, user-specified motor power, user-specified battery capacity, user-specified maximum speed and altitude, and the like.

FIG. 5c illustrates an example construction robot 540 created from a robot template, according to one embodiment. In the embodiment of FIG. 5c, the construction robot 540 is built from a template that specifies a tread base 542, a tractor body 544, a lifting arm 546, a pushing arm 548, and a tractor cab 550. A user has further customized the construction robot 540, for instance by adding a scoop effector 554 at the end of the first arm 546, by adding a bulldozer blade effector 552 at the end of the second arm 548, by adding a weight sensor 556 within the first arm, by adding a fill capacity sensor 558 within the scoop effector, by adding a force sensor 560 within the second arm, and by adding a LIDAR sensor 562 at the top of the cab 550. Further customizations that might not be apparent from the embodiment of FIG. 5c include user-specified horsepower of an engine of the construction robot 540, a tread type of the tread base 542, a power available to the first arm 546 and the second arm 548, a capacity or dimension of the scoop effector 554, a dimension and material of the bulldozer blade 552, and the like.

Returning to the embodiment of FIG. 2, the robot update engine 240 enables a user to update one or more aspects of a robot within a simulation. During a simulation, a user (such as the user 105) can determine that the design of a robot being simulated is not ideal, needs to be updated, or is problematic. For instance, a user can determine that the dimensions of a robot are too large for safe operation within a hallway of the virtual environment. Likewise, a user can determine that the amount of battery power allocated to an autonomous electric automobile robot is too low. Finally, a user can determine that the material used within an arm of a construction robot is too weak to lift scooped dirt. In each of these examples, the user may want to change a characteristic of the simulated robot in order to produce a better performing or otherwise more ideal robot design.

Accordingly, the user can provide one or more updated customization parameters to the robot update engine 240. In some embodiments, each provided updated customization parameter changes a characteristic or property of the simulated robot. For instance, an updated customization parameter can change a weight or mass of a robot component, an amount of power available to the robot, or any other robot characteristic or parameter described herein. In some embodiments, the updated customization parameters can include changes to a robot base type, a robot body type, a robot attachment, a robot effector, and a robot sensor, such as any of the bases, bodies, attachments, effectors, and sensors described herein. In some embodiments, the updated customization parameters can include a change to a new robot template stored within the robot templates storage medium 260.

The robot update engine 240 can present interface elements that, when interacted with by a user, assist the user in providing updated customization parameters, for instance within a dedicated robot update interface or within a portion of a simulation session monitoring interface displayed by a client. For instance, the robot update engine 240 can include within an interface displayed by a client each property or characteristic of a robot, each robot component, and each operation available to the robot or a robot component. When a user interacts with, for example, a robot component displayed within the interface, the robot update engine 240 can include one or more interface elements that, when interacted with, enable the user to swap the robot component with a different component, or to modify a property or characteristic of the robot component.

In some embodiments, a user can opt to test a particular robot property or characteristic during a simulation by giving a range of values for the property or characteristic. In response, the robot update engine 240 can increment a value of the property or characteristic based on the range after the passage of an interval of time. For instance, a user may wish to simulate a construction robot with a scoop arm that ranges in length from 6 feet to 10 feet. In this example, the robot update engine 240 can first simulate the construction robot with a scoop arm of 6 feet in length, and can increase the length of the scoop arm by 6 inches every 2 minutes until the scoop arm is 10 feet long. This beneficially enables a user to automatically test out a range of robot configurations without having to manually update the design of the robot multiple times. Likewise, a user can opt to test a range of virtual environment properties or scenarios, for instance by varying a size of an object within the virtual environment, by varying a behavior of a simulated human within the virtual environment, and the like.

In some embodiments, the robot update engine 240 can recommend one or more aspects of a simulated robot design or a virtual environment design to change. For instance, the robot update engine 240 can determine that an amount of battery power available to a drone with a particular mass won't enable the drone to fly for at least a threshold amount of time, and can recommend that the amount of battery power available to the drone be increased, or that the mass of the drone be decreased. In some embodiments, the robot update engine 240 recommends one or more aspects of a simulated robot design to change based on a predetermined set of rules (e.g., a rule specifying that no robot can have a maximum speed above a particular threshold, robots with an above-threshold mass aren't allowed on roads, the dimensions of a delivery robot must be less than the width of a sidewalk, and the like). In some embodiments, the robot update engine 240 recommends one or more aspects of a simulated robot design to change based on machine movement or behavior within a robot simulation session. For instance, the robot update engine 240 can determine that a bulldozer robot ran out of gas during a robot simulation session, and can recommend that the user increase the fuel capacity of the bulldozer robot. In some embodiments, the robot update engine 240 can recommend an aspect of a simulated robot design to change within a robot simulation session based on an interaction between robots, a collision between robots and other robots, a collision between robots and objects within the virtual environment, and the like. In some embodiments, the robot update engine 240 can automatically change one or more aspects of a simulated robot design or a virtual environment design, and can notify a user of the change.

Upon receiving the updated customization parameters, the robot update engine 240 can change the design of the simulated robot based on the updated customization parameters within the robot simulation session. For instance, a simulated robot that got stuck in rocky terrain of a virtual environment can, when modified, have a greater clearance, larger wheels, and the like, beneficially enabling the simulated robot to become dislodged and to move about the terrain once more. The change of a robot's design by the robot update engine 240 can be immediate, changing the appearance, structure, and/or capabilities of the instantiated robot within the robot simulation session. A user, such as a user 120, that was previously controlling the simulated robot within the virtual environment can continue to control the updated robot. In other words, the design of the robots being simulated within a robot simulation session can be updated in real-time, during a simulation, allowing an operator of the updated robot to continue to control and operate the robot within the virtual environment during the simulation, and without having to end or re-start the simulation, beneficially reducing the amount of time required to initialize and run a robot simulation session.

Figure 6:
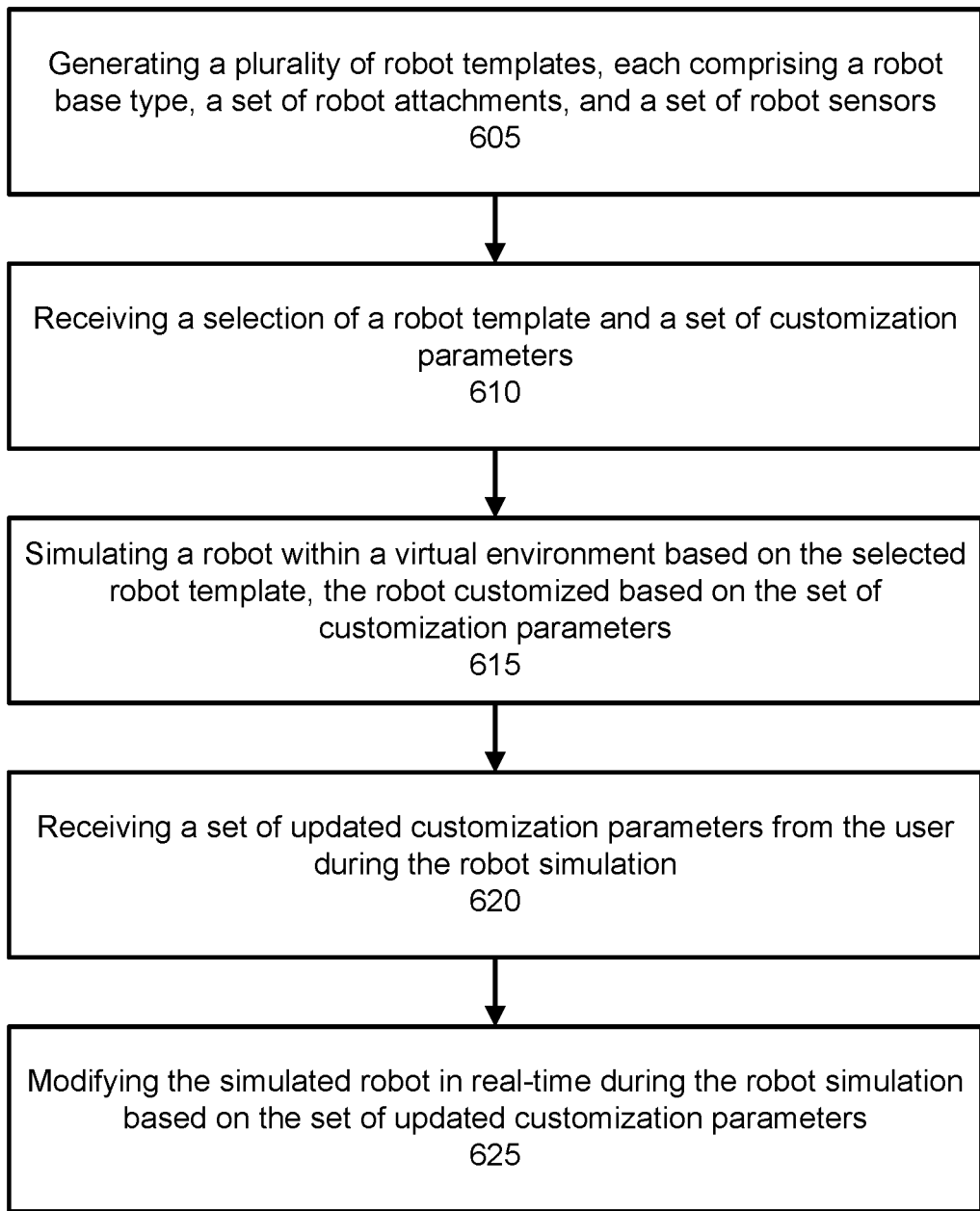
FIG. 6 is a flow chart illustrating a process of generating a robot using a robot template, simulating the robot, and updating the robot within the simulation, according to one embodiment.

FIG. 6 is a flow chart illustrating a process of generating a robot using a robot template, simulating the robot, and updating the robot within the simulation, according to one embodiment. A plurality of robot templates are generated 605, for instance by a robot engine of a robot simulation server. Each robot template can include one or more of a robot base type, a robot body type, a set of one or more robot attachments, a set of one or more robot effectors, and a set of one or more robot sensors. A selection of one of the robot templates and is received 610 from a user. A set of customization parameters describing requested customizations to the selected robot template is also received from the user. As noted above, the selected robot template and set of customization parameters can be stored as a robot instance for subsequent use in a robot simulation session (e.g., by the user or another user).

A robot is generated based on the selected robot template, customized based on the set of customization parameters, and simulated 615 within a virtual environment by the robot simulation server. During the course of the simulation, a set of updated customization parameters is received 620 from the user. For instance, the user can request one or more properties or characteristics of the simulated robot to be changed mid-simulation. The simulated robot is then modified 625 in real-time during the robot simulation based on the set of updated customization parameters, beneficially enabling a user to simulate the structure and behavior of the updated robot without having to reset or restart the simulation.

It should be noted that in some embodiments, a portion of the simulation can be re-simulated without having to restart the entire simulation. For instance, a particular scenario within the simulation can be re-simulated, preventing the need to stop the current simulation, re-instantiate the virtual environment, and re-initialize the simulation. In such embodiments, a user can be prompted to re-simulate a portion of the robot simulation session, for instance via a pop-up window or other interface element within a simulation interface. The interface element can enable the user to specify a time during the simulation at which the re-simulation of the portion of the simulation session is to begin. Re-simulating portions of a robot simulation session is described in greater detail below.

Re-Simulation Based on User Intervention

Returning to the embodiment of FIG. 2, the session update engine 245 enables the re-simulation of a portion of a robot simulation session corresponding to the detection of a user intervention of an autonomously controlled robot within a virtual environment. As noted above, a robot can be instantiated within a virtual environment by a robot simulation server 130, and can be autonomously controlled by an autonomous robot control program running on a client remote from a robot simulation server (such as a machine-controlled client device 125). While the robot is being autonomously controlled, a user can monitor the behavior of the robot within the virtual environment, and can intervene to assume control of the robot from the autonomous robot control program. For instance, the user can interact with an interface element displayed by a client autonomously controlling the robot and corresponding to a switch from autonomous robot control to user robot control within the virtual environment. In some embodiments, the user intervention includes a request by the user to pause or stop the robot simulation session, to halt movement or behavior of the robot within the virtual environment, to cause the robot to apply brakes or reduce speed, to cause the robot to alter a direction of movement, to cause the robot to perform an operation that it wasn't otherwise performing, and the like.

When the session update engine 245 detects the user intervention, the session update engine identifies an intervention simulation time corresponding to the user intervention. In some embodiments, the intervention simulation time includes a time between the execution of the robot simulation session and the detected user intervention, while in other embodiments the intervention simulation time includes a timestamp corresponding to a time within the robot simulation session corresponding to the detected user intervention or to a real-world time at which the user intervention was detected.

The session update engine 245 can enable a user (such as the user 105 or, if different, the user that intervened to control the robot) to re-simulate a portion of the robot simulation session corresponding to the detected user intervention. In some embodiments, the session update engine 245 can prompt a user to re-simulate the portion of the robot simulation session corresponding to the detected user intervention at the time of or within a threshold amount of time after detecting the user intervention. In some embodiments, the session update engine 245 can prompt the user to re-simulate the portion of the robot simulation session after the robot simulation session has otherwise concluded.

In response to a request from a user to re-simulate a portion of the robot simulation session corresponding to the detected user intervention, the session update engine 245 can determine an updated simulation starting time representative of a time within the robot simulation session at which the re-simulated portion of the robot simulation session will begin. The updated simulation starting time is a threshold amount of time before the intervention simulation time (the time at which the user intervention is detected). The threshold amount of time used to determine the updated simulation starting time can be selected based on one or more of: a location of the robot within the virtual environment at the intervention simulation time, a cause for the detected intervention, a speed of the robot at the intervention simulation time, an amount of time selected by the user, a default amount of time, or any other suitable criteria.

The session update engine 245 identifies a set of conditions of the virtual environment and the robot corresponding to the updated simulation starting time. In some embodiments, the session update engine 245 can access the set of conditions from the session log 255, which can store a location, position, state, and activity of the robot and the virtual environment throughout the robot simulation session. For example, the session update engine 245 can query the session log 255 with a time stamp corresponding to the updated simulation starting time and can receive, in response, a location of each robot and object within a virtual environment at the time within the robot simulation session corresponding to the timestamp.

The set of conditions accessed by the session update engine 245 corresponding to the updated simulation starting time can include one or more of: a location of the robot for which human intervention was detected at the updated simulation starting time, a location of each object within the virtual environment at the updated simulation starting time, a location of any humans or any other user-modified object or actor within the virtual environment at the updated simulation starting time, a location of each other robot within the virtual environment at the updated simulation starting time, and a location of each vehicle within the virtual environment at the updated simulation starting time. In some embodiments, the set of conditions accessed by the session update engine 245 further include, at the updated simulation starting time, a state, operation, movement (including linear and angular velocity and acceleration), and/or orientation of the robot for which human intervention was detected, objects, people, other robots, and vehicles within the virtual environment.

The session update engine 245, after determining the updated simulation starting time and identifying the set of conditions corresponding to the updated simulation starting time, can re-simulate the portion of the robot simulation session starting from the updated simulation starting time. The robot and each object, person, vehicle, and other robot within the robot simulation session is instantiated at the location within the same virtual environment specified by the identified set of conditions, and the session update engine 245 executes the updated robot simulation session beginning from the updated simulation starting time. In other words, the session update engine 245 executes a new robot simulation session but with the initial conditions of the new robot simulation session corresponding to a state of the previous robot simulation session at the updated simulation starting time. It should be noted that the set of initial conditions at the updated simulation starting time will be different from the initial conditions of the previous robot simulation session, since the previous robot simulation session started at an earlier time (relative to the updated simulation starting time).

By re-simulating the portion of the robot simulation session corresponding to a human intervention into the autonomous control of a robot within a virtual environment, the session update engine 245 can enable a user to re-simulate a most relevant portion of the robot simulation session without having to re-simulate a less relevant portion of the robot simulation session leading up to the most relevant portion of the robot simulation session. This reduces the amount of time required to re-simulate the events leading up to the user intervention, beneficially enabling the user to quickly identify and understand the circumstances causing the user intervention, to modify a simulated robot's design, and to modify logic within the automated robot control program controlling the simulated robot.

It should be noted that in some embodiments, a portion of a robot simulation session can be re-simulated in response to re-simulation criteria other than a human intervention into an autonomously-controlled robot. Examples of such re-simulation criteria include but are not limited to: a collision between robots, a collision by an autonomously controlled robot into another robot or object/person/vehicle/structure within the virtual environment, a collision by a user-controlled robot into another robot or object/person/vehicle/structure within the virtual environment, the performance of a particular operation by a robot within the virtual environment, the completion of a particular task by a robot within the virtual environment, the satisfaction of one or more user-defined criteria by a robot, a violation of one or more safety or stability triggers during the robot simulation session, and the like. The principles describing the re-simulation of a portion of the robot simulation session included herein apply equally to the re-simulation of a portion of the robot simulation session in response to these other types of re-simulation criteria.

Figure 7A:
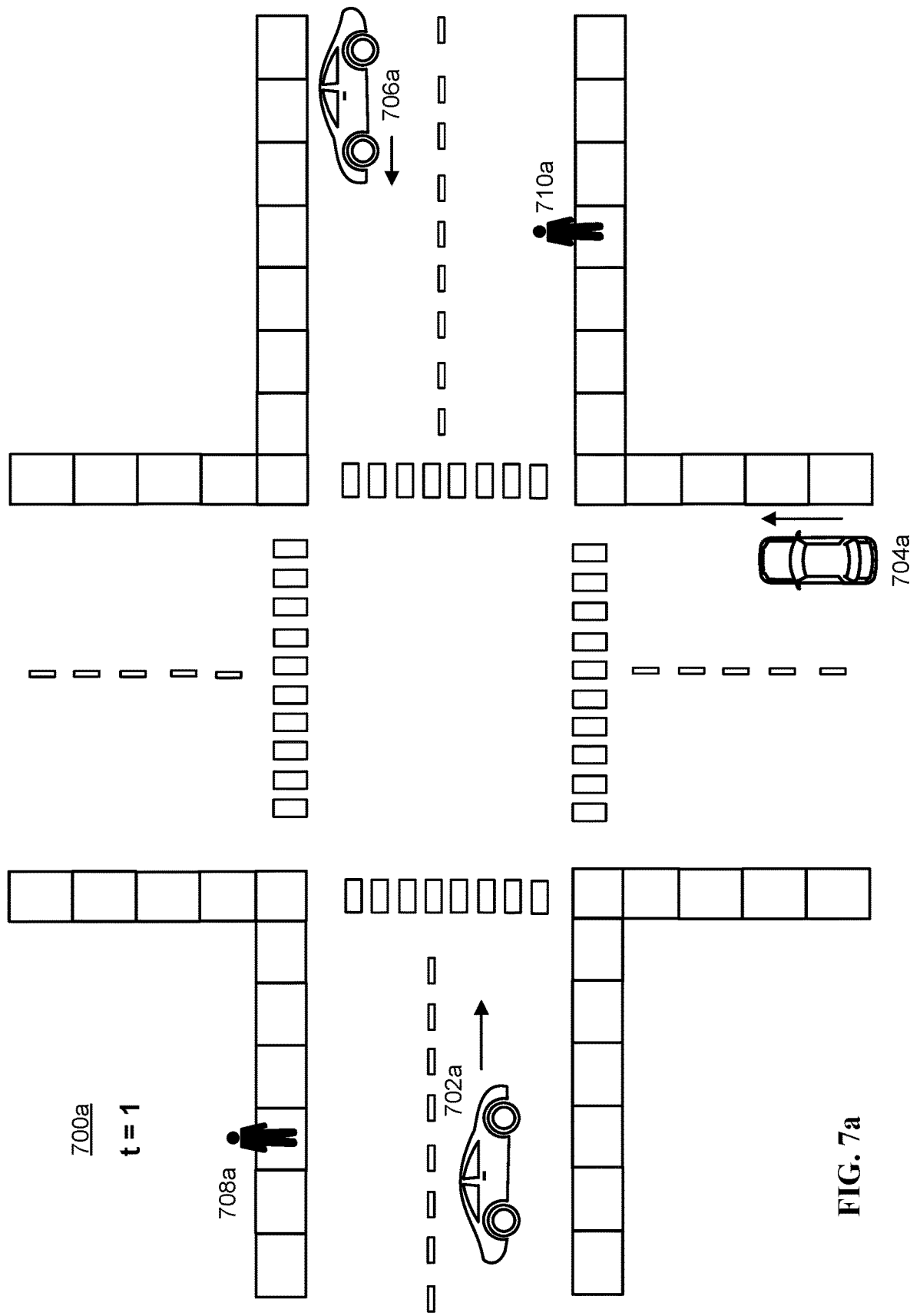
FIGS. 7a-7c illustrate an example robot simulation session at various times for the purpose of re-simulating a portion of the robot simulation session, according to one embodiment.
Figure 7B:
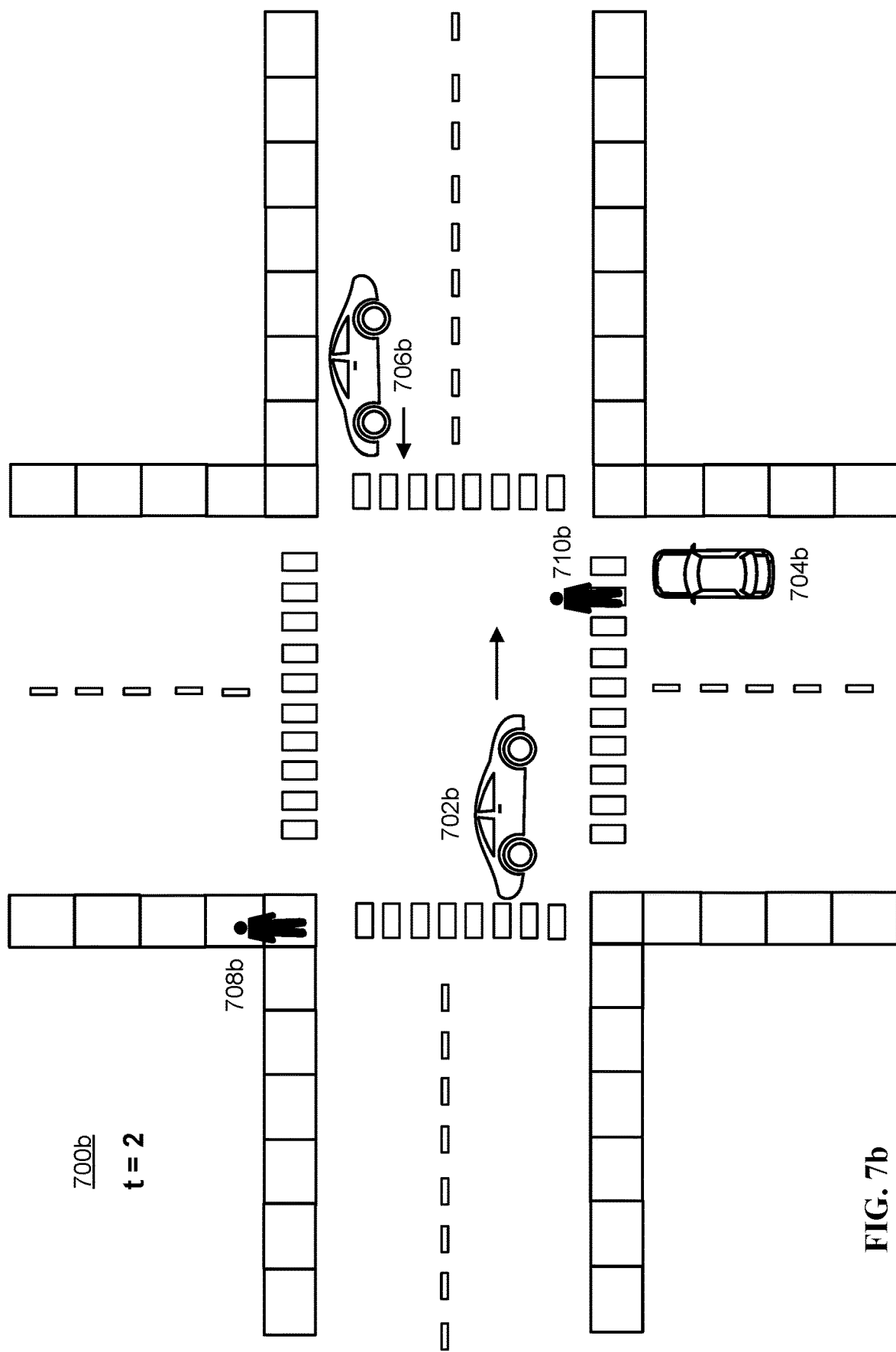
Figure 7C:
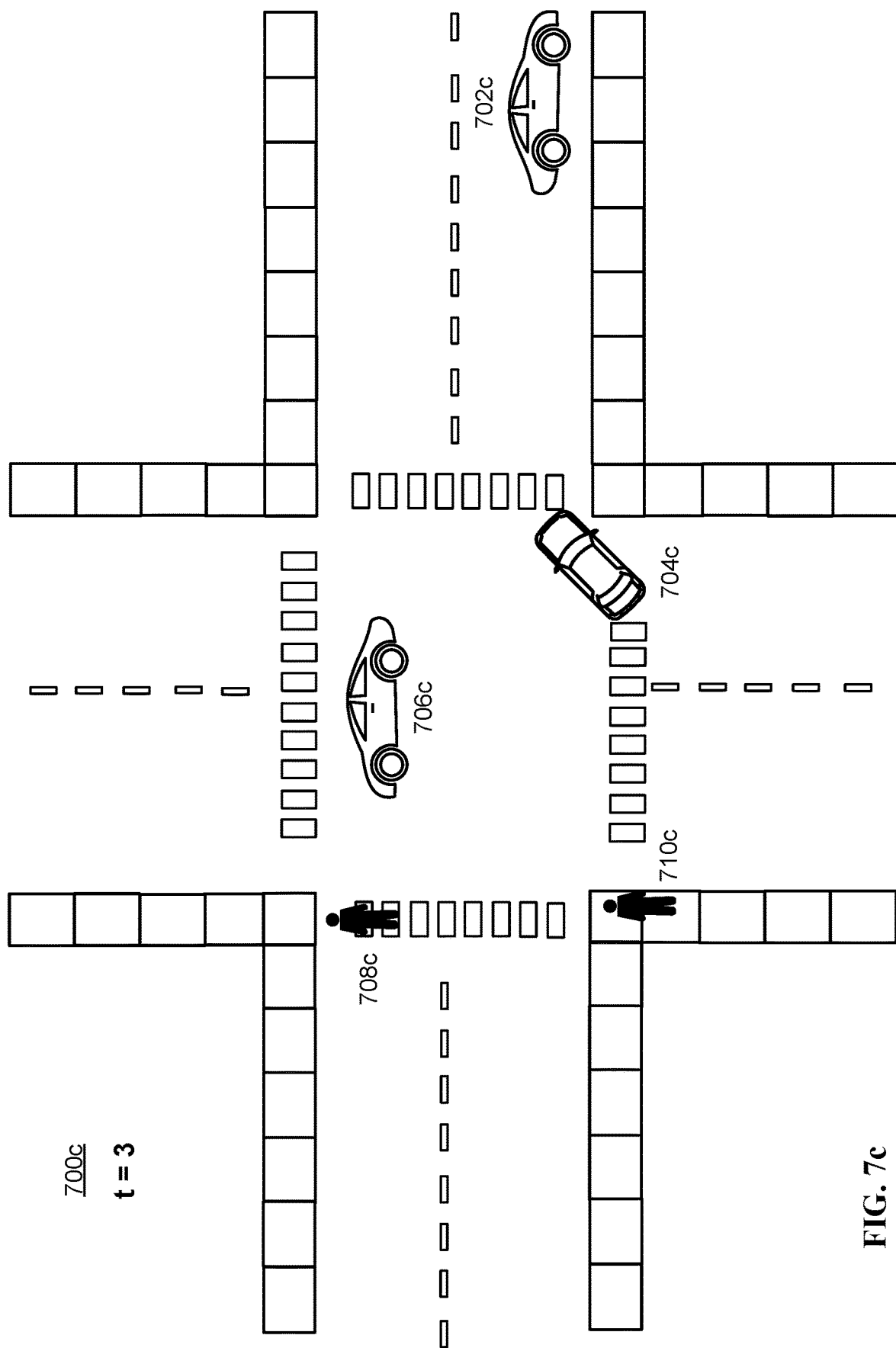

FIGS. 7a-7c illustrate an example robot simulation session at various times for the purpose of re-simulating a portion of the robot simulation session, according to one embodiment. In particular, FIG. 7a illustrates a beginning of the example robot simulation session at a first time (t=1), FIG. 7b illustrates the example robot simulation session at a second time (t=2), and FIG. 7c illustrates the example robot simulation session at a third time (t=3). Each of FIGS. 7a-7c illustrate an intersection between two roads, three autonomous robots (automobiles 702, 704, and 706), and two pedestrians (pedestrian 708 and 710). It should be noted that the inputs provided by clients to control the autonomous robots and the pedestrians during the robot simulation session are recorded and logged, enabling the subsequent re-simulation of a portion of the robot simulation session.

In the virtual environment 700a of FIG. 7a at the time t=1, each of the three vehicles 702a, 704a, and 706a are driving in an indicated direction, and pedestrians 708a and 710a are walking along a sidewalk towards an intersection. In the virtual environment 700b of FIG. 7b at the time t=2, the autonomous automobile 702b has entered the intersection, the autonomous automobile 704b has stopped in front of a cross walk of the intersection to yield to the pedestrian 710b, and the autonomous automobile 706b has approached but not entered the intersection. The pedestrian 708b has arrived at a corner of the sidewalk of the intersection.

In the virtual environment 700c of FIG. 7c at the time t=3, the pedestrian 710c has crossed the intersection, the autonomous automobile 702 has proceeded through the intersection, and the autonomous automobile 704c has begun to turn from a first road of the intersection to the second road. The autonomous automobile 706c has proceeded through the intersection at the same time the pedestrian 708c has stepped into the intersection. A human operator observing the behavior of the autonomous automobile 706c, upon seeing the pedestrian 708c step in front of the autonomous automobile 706c, intervenes and manually causes the autonomous automobile 706c to stop.

In response to detecting the human intervention at time t=3, the session update engine 245 can identify the time t=3 as the intervention simulation time, can identify time t=2 as the updated simulation starting time, and can identify the positions of the autonomous automobiles 702b, 704b, and 706b, and the positions of the pedestrians 708b and 710b within the virtual environment 700b as the set of conditions of the virtual environment at the time t=2. The session update engine 245 can then execute an updated robot simulation session, beginning at time t=2, with the autonomous automobiles 702b, 704b, and 706b and the pedestrians 708b and 710b as illustrated in FIG. 7b. By re-simulating only the portion of the robot simulation session of FIGS. 7a-7c beginning at time t=2, the portion of the robot simulation session less relevant to the detected intervention (e.g., the portion of the robot simulation session between time t=1 and time t=2) can be bypassed, beneficially reducing the amount of time required to re-simulate a relevant portion of a robot simulation session.

Figure 8:
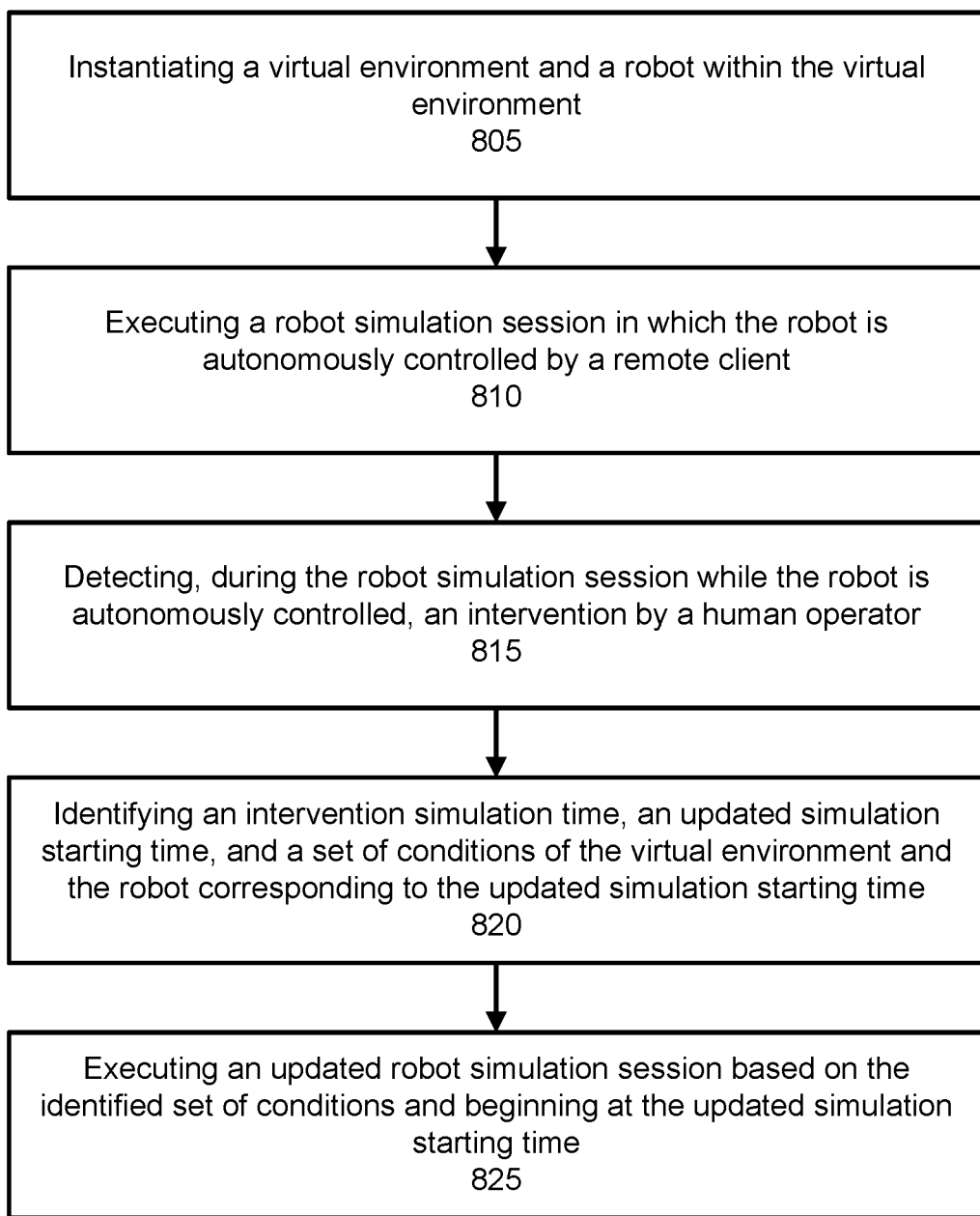
FIG. 8 is a flow chart illustrating a process of re-simulating a portion of a robot simulation session in response to detecting a human intervention into the control of an autonomous robot, according to one embodiment.

FIG. 8 is a flow chart illustrating a process of re-simulating a portion of a robot simulation session in response to detecting a human intervention into the control of an autonomous robot, according to one embodiment. A virtual environment is instantiated 805, and a robot is instantiated within the virtual environment. A robot simulation session is executed 810, during which the robot is autonomously controlled by a remote client (or by the robot simulation server 130). For instance, the robot simulation session can include the simulation of the behavior of an autonomous vehicle, and the virtual environment can include a representation of a city block.

During a portion of the robot simulation session in which the robot is autonomously controlled, an intervention by a human operator is detected 815. In response to detecting the intervention by the human operator, an intervention simulation time, an updated simulation starting time, and a set of conditions of the virtual environment and the robot corresponding to the updated simulation starting time are identified 820. An updated robot simulation session is then executed 825 based on the identified set of conditions and beginning at the updated simulation starting time, enabling a user to bypass a first portion and re-simulate a relevant portion of the robot simulation session.

In some embodiments, the robot simulation server 130 can receive data describing a real-world intervention by a human into the autonomous control of a real-world robot. For instance, an autonomous automobile can be autonomously driven down a road, and a human operator within the automobile, in response to seeing a pedestrian about to step into the path of the automobile, can take manual control of the automobile to apply the brakes and ensure that the automobile stops in time. Even if the autonomous automobile might have stopped itself in time to avoid the pedestrian, allowing the autonomous automobile to proceed autonomously risks the safety of the pedestrian. Accordingly, such embodiments present a challenge, namely how to test the autonomous robot control program controlling the automobile to determine whether or not the automobile would have stopped itself in time?

To address this challenge, the autonomous automobile can capture data representative of the real-world environment of the vehicle in the lead-up to the user intervention by the human operator of the automobile. For instance, the autonomous automobile can include a GPS receiver identifying the location of the automobile for the period of time before the user intervention, can include a 360-degree camera array capturing images of the surroundings of the automobile for the period of time before the user intervention, and can include a LIDAR system capturing a distance between the automobile and objects around the automobile. Such data can be provided by the autonomous automobile to the robot simulation server 130. Likewise, the autonomous automobile (or an external resource) can provide data describing the structure of the autonomous automobile and describing the autonomous robot control program that controlled the automobile while it was autonomously driven to the robot simulation server 130. In addition, the robot simulation server 130 can access data representative of the real-world environment of the autonomous automobile from an external source, for instance a map of an area around the location of the autonomous automobile from a map database, vehicle data representative of a position and behavior of other vehicles within a proximity of the autonomous automobile from the other vehicles, and the like. In other words, the robot simulation server 130 can receive data representative of the environment and surroundings of the autonomous automobile and representative of the behavior of the pedestrian.

Using the received data describing the real-world environment of the autonomous automobile in the period of time immediately preceding the user intervention by the human operator of the autonomous automobile, the session update engine 245 can, via the environment engine 210, instantiate a virtual environment representative of the real-world environment of the autonomous automobile. Likewise, the session update engine 245 can, via the robot engine 215, instantiate a virtual representation of the autonomous automobile itself within the virtual environment. In some embodiments, the environment engine 210 and the robot engine 215 can select pre-programmed environment objects, structures, and vehicles from the simulation database 250 representative of the real-world received data, or can generate new objects, structures, and vehicles to match the real-world receive data. Finally, the session update engine 245 can simulate, for instance via the session engine 225, the actions of the objects, vehicles, and people as they occurred within the real-world environment of the autonomous automobile in the period of time immediately preceding the user intervention. Thus, the session update engine 245 can simulate a virtual representation of the events that occurred within the real-world within a robot simulation session, including the pedestrian stepping out in front of the autonomous automobile (either controlled by an autonomous control program or by a human operator), but where one or more human operators can control one or more humans or vehicles within the simulation session, where the human or vehicle behavior within the simulation session can be modified. In other example, the session update engine 245 can simulate a virtual representation of real-world events in which an autonomous vehicle makes a late or rolling stop based on a predetermined safe braking distance or mechanical limitations, enabling a simulation of how pedestrians or other cars (either human or machine controlled) may change their behavior in response.

Once the robot simulation session based on the real-world received data is executed, the autonomous robot control program that was operating the autonomous automobile can be tested. And in particular, the behavior of the autonomous automobile in response to the pedestrian stepping in front of the autonomous automobile can be tested. By simulating the real-world scenario in the lead-up to the user intervention by the human operator of the autonomous automobile, a user can evaluate whether the autonomous automobile would have performed safely in the real-world, but without posing any risk to the real-world pedestrian. It should be noted that although this description of simulating real-world autonomous robot behavior is described in the context of automobiles and human operators of the autonomous automobiles, in practice, the behavior of other types of autonomous robots and other types of human operators can likewise be tested (such as autonomous construction vehicles, autonomous delivery robots, remote human operators, and the like).

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of simulating robot behavior, comprising:
    initializing, by a cloud server, a robot simulation session in response to a first request from a user by:
        instantiating, by the cloud server, a virtual environment within the robot simulation session, an object of the virtual environment instantiated using one or more environment parameters; and
        instantiating, by the cloud server, a set of robots within the virtual environment, each robot comprising a corresponding set of virtual sensors;
    establishing, by the cloud server, a communicative connection with one or more clients running on client devices remote from the cloud server;
    for each of the set of robots, providing, by the cloud server, control of the robot to one of the one or more clients, wherein data representative of the virtual environment available to the client comprises data perceived by the set of virtual sensors corresponding to the robot;
    beginning, by the cloud server, the robot simulation session, wherein inputs for the set of robots are provided to the cloud server by the one or more clients, and wherein the cloud server, in response to receiving inputs for the set of robots, is configured to simulate behavior of the set of robots within the virtual environment based on the received inputs;
    simulating an interaction between a robot of the set of robots and the object of the virtual environment
    recommending a modification to an environment parameter of the object to the user based on the simulated interaction;

modifying the environment parameter of the object based on the recommended modification in response to a second request from the user; and capturing, by the cloud server during the robot simulation session, data representative of movement of the robots, interactions between robots, and interactions between robots and the virtual environment.

2. The method of claim 1, wherein instantiating the virtual environment comprises generating a simulated physical representation within the virtual environment of one or more of: one or more types of ground, one or more bodies of water, buildings, vehicles, people, plants, roads, physical objects, weather conditions, temperature conditions, and atmospheric conditions.

3. The method of claim 1, wherein the one or more environment parameters are specified by the first request to initialize the robot simulation session.

4. The method of claim 1, wherein instantiating the set of robots comprises, for each robot, generating a simulated physical representation within the virtual environment of the robot.

5. The method of claim 1, wherein each robot comprises a vehicle configured to be autonomously operated or manually operated by a human operator.

6. The method of claim 1, wherein each robot comprises one or more of:
an automobile, a truck, a tractor, a construction vehicle, a motorcycle, a scooter, a drone, a boat, a submersible vehicle, or a robotic vehicle.

7. The method of claim 1, wherein the set of virtual sensors corresponding to each robot comprise one or more of: one or more cameras or camera arrays, a LIDAR, a GPS receiver, a depth sensor, an IMU, a gyroscope, an accelerometer, a motion detector, a temperature sensor, a pressure sensor, a weight sensor, and a microphone.

8. The method of claim 1, wherein data representative of the virtual environment available to the client is limited to data perceived by the set of virtual sensors corresponding to the robot.

9. The method of claim 1, wherein instantiating the virtual environment and the set of robots comprises generating a 3-dimensional graphical representation of the virtual environment and the set of robots using a graphical processing unit and physics engine.

10. The method of claim 1, wherein the inputs provided by a client for a corresponding robot comprise configuration inputs, and wherein the cloud server is configured to configure a state of the robot within the virtual environment based on the configuration inputs.

11. The method of claim 1, wherein the inputs provided by a client for a corresponding robot comprise movement inputs, wherein the cloud server is configured to move the robot within the virtual environment based on the movement inputs, and wherein the movement inputs specify one or more of: a direction for the robot, a speed for the robot, an acceleration for the robot, and an orientation for the robot.

12. The method of claim 1, further comprising:
accessing a predefined range of values for the environment parameter, wherein the recommended modification includes assigning a value of the predefined range of values to the environment parameter.

13. The method of claim 1, wherein the inputs provided by a client for a corresponding robot comprise operation inputs, and wherein the cloud server is configured to cause the robot to perform an operation based on the operation inputs.

14. The method of claim 13, wherein the operation inputs specify one or more of: a movement of an attachment of the robot, an interaction between the robot and the virtual environment, an interaction between the robot and one or more other robots, and a robot configuration instruction.

15. The method of claim 1, wherein the inputs provided by a client for a corresponding robot comprise virtual sensor inputs, and wherein the cloud server is configured to configure one or more virtual sensors of the robot based on the virtual sensor inputs.

16. The method of claim 1, wherein the cloud server is configured to simulate behavior of the set of robots within the virtual environment by receiving information describing behavior of each robot from a client corresponding to the robot and synchronizing the behavior of the set of robots based on the received information.

17. The method of claim 1, wherein the simulated behavior for each robot within the virtual environment is based only on the received inputs.

18. The method of claim 1, wherein the received inputs associated with a robot are received from one or both of human operators of a client associated with the robot and an autonomous robot control programs running on the client associated with the robot.

19. A cloud server for simulating robot behavior, the cloud server comprising at least one processor configured to execute instructions stored on a non-transitory computer-readable storage medium that, when executed, cause the cloud server to perform steps comprising:
initializing a robot simulation session in response to a first request from a user by:
instantiating a virtual environment within the robot simulation session, an object of the virtual environment instantiated using one or more environment parameters; and
instantiating a set of robots within the virtual environment, each robot comprising a corresponding set of virtual sensors;
establishing, a communicative connection with one or more clients running on client devices remote from the cloud server;
for each of the set of robots, providing control of the robot to one of the one or more clients, wherein data representative of the virtual environment available to the client comprises data perceived by the set of virtual sensors corresponding to the robot;
beginning the robot simulation session, wherein inputs for the set of robots are provided to the cloud server by the one or more clients, and wherein the cloud server, in response to receiving inputs for the set of robots, is configured to simulate behavior of the set of robots within the virtual environment based on the received inputs; simulating an interaction between a robot of the set of robots and the object of the virtual environment;
recommending a modification to an environment parameter of the object to the user based on the simulated interaction;
modifying the environment parameter of the object based on the recommended modification in response to a second request from the user; and
capturing, during the robot simulation session, data representative of movement of the robots, interactions between robots, and interactions between robots and the virtual environment.

20. A non-transitory computer-readable storage medium storing executable instructions that, when executed by a processor, cause steps to be performed comprising:

initializing, by a cloud server, a robot simulation session in response to a first request from a user by:
- instantiating, by the cloud server, a virtual environment within the robot simulation session, an object of the virtual environment instantiated using one or more environment parameters; and
- instantiating, by the cloud server, a set of robots within the virtual environment, each robot comprising a corresponding set of virtual sensors;

establishing, by the cloud server, a communicative connection with one or more clients running on client devices remote from the cloud server;

for each of the set of robots, providing, by the cloud server, control of the robot to one of the one or more clients, wherein data representative of the virtual environment available to the client comprises data perceived by the set of virtual sensors corresponding to the robot;

beginning, by the cloud server, the robot simulation session, wherein inputs for the set of robots are provided to the cloud server by the one or more clients, and wherein the cloud server, in response to receiving inputs for the set of robots, is configured to simulate behavior of the set of robots within the virtual environment based on the received inputs;

simulating an interaction between a robot of the set of robots and the object of the virtual environment;

recommending a modification to an environment parameter of the object to the user based on the simulated interaction;

modifying the environment parameter of the object based on the recommended modification in response to a second request from the user; and capturing, by the cloud server during the robot simulation session, data representative of movement of the robots, interactions between robots, and interactions between robots and the virtual environment.

* * * * *